United States Patent
Fuchikami et al.

(10) Patent No.: US 9,978,148 B2
(45) Date of Patent: May 22, 2018

(54) MOTION SENSOR APPARATUS HAVING A PLURALITY OF LIGHT SOURCES

(71) Applicant: PANASONIC INTELLECTUAL PROPERTY CORPORATION OF AMERICA, Torrance, CA (US)

(72) Inventors: Ryuji Fuchikami, Fukuoka (JP); Tadanori Tezuka, Fukuoka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 399 days.

(21) Appl. No.: 14/410,168

(22) PCT Filed: Apr. 8, 2014

(86) PCT No.: PCT/JP2014/002002
§ 371 (c)(1),
(2) Date: Dec. 22, 2014

(87) PCT Pub. No.: WO2014/174779
PCT Pub. Date: Oct. 30, 2014

(65) Prior Publication Data
US 2015/0193934 A1 Jul. 9, 2015

(30) Foreign Application Priority Data
Apr. 26, 2013 (JP) .................... 2013-093458

(51) Int. Cl.
*H04N 5/225* (2006.01)
*G06T 7/00* (2017.01)
(Continued)

(52) U.S. Cl.
CPC .............. *G06T 7/0044* (2013.01); *G01C 3/08* (2013.01); *G06F 3/017* (2013.01); *G06F 3/0346* (2013.01);
(Continued)

(58) Field of Classification Search
CPC combination set(s) only.
See application file for complete search history.

(56) References Cited

U.S. PATENT DOCUMENTS

2001/0021011 A1 9/2001 Ono
2003/0193657 A1* 10/2003 Uomori ................ G01B 11/25
356/3.1
(Continued)

FOREIGN PATENT DOCUMENTS

JP 06-042915 A 2/1994
JP 2001-012909 A 1/2001
(Continued)

OTHER PUBLICATIONS

International Search Report for corresponding International Application No. PCT/JP2014/002002 dated Jul. 15, 2014.
(Continued)

*Primary Examiner* — Janese Duley
(74) *Attorney, Agent, or Firm* — Renner Otto Boisselle & Sklar, LLP

(57) ABSTRACT

A motion sensor device according to an embodiment of the present disclosure includes an image sensor and LED light sources. Using three images captured by the image sensor when only the LED light source is turned ON, when only the LED light source is turned ON, and when only the LED light source is turned ON, respectively, the motion sensor device estimates the distance to an object based on the luminance ratio of the object.

8 Claims, 14 Drawing Sheets

(51) Int. Cl.
*G06F 3/01* (2006.01)
*G06F 3/0346* (2013.01)
*G01C 3/08* (2006.01)
*G06T 7/73* (2017.01)

(52) U.S. Cl.
CPC ............. *G06T 7/74* (2017.01); *H04N 5/2256* (2013.01); *G06T 2207/10004* (2013.01); *G06T 2207/10152* (2013.01)

(56) References Cited

U.S. PATENT DOCUMENTS

| | | | | |
|---|---|---|---|---|
| 2008/0186475 | A1* | 8/2008 | Kawata | G01B 11/026 356/73 |
| 2010/0141946 | A1* | 6/2010 | Johannesson | G01B 11/2518 356/338 |
| 2012/0232836 | A1* | 9/2012 | Ohmi | G06F 3/0304 702/150 |
| 2013/0120565 | A1* | 5/2013 | Wilks | G01S 7/497 348/135 |

FOREIGN PATENT DOCUMENTS

| | | |
|---|---|---|
| JP | 2001-165655 A | 6/2001 |
| JP | 2002-062111 A | 2/2002 |
| JP | 2004-117235 A | 4/2004 |
| JP | 2013-024653 A | 2/2013 |

OTHER PUBLICATIONS

Form PCT/ISA/237 for corresponding International Application No. PCT/JP2014/002002 dated Jul. 15, 2014 and partial English translation.

Mariko Takeuchi, Kunihito Kato and Kazuhiko Yamamoto, "Establishing Gesture Interface System Using Near-Infrared Skin Detection", the Institute of Image, Information and Television Engineers (ITE) Technical Report vol. 34, No. 34, ME 2010-122 (Aug. 2010) and concise English translation.

\* cited by examiner

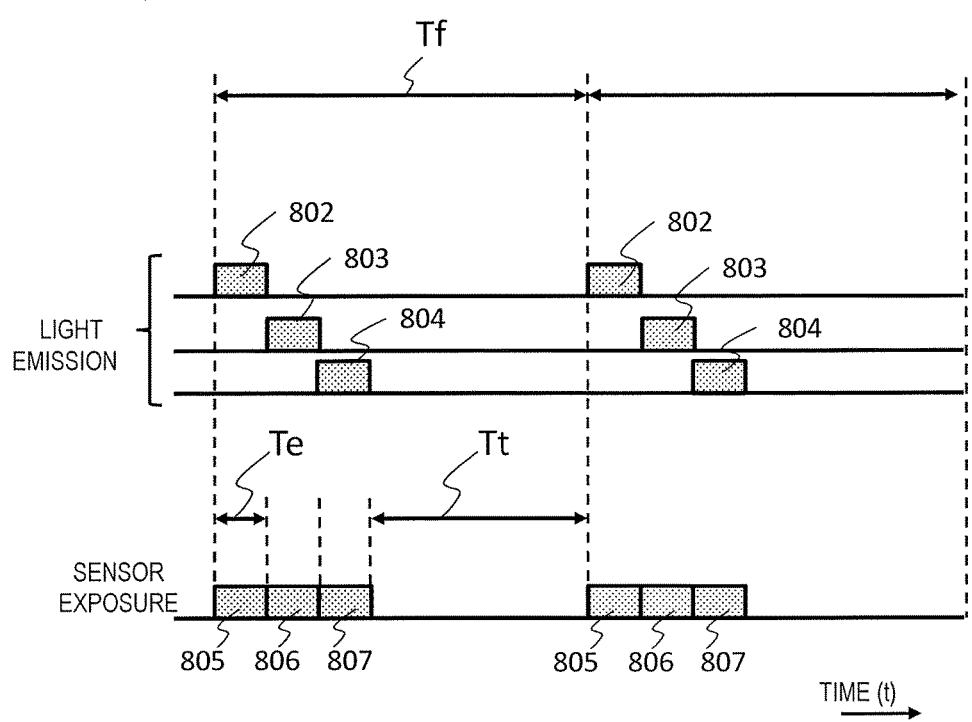

MOTION SENSOR APPARATUS HAVING A PLURALITY OF LIGHT SOURCES

This application is a national stage of PCT/JP2014/002002 filed on Apr. 8, 2014 and claims the benefit of Japanese Application No. 2013-093458 filed on Apr. 26, 2013.

TECHNICAL FIELD

The present application relates to a motion sensor device with multiple light sources.

BACKGROUND ART

Patent Document No. 1 discloses a technique for measuring the distance to an object (or target) which is either standing still or moving based on a plurality of images that have been captured by a single image sensor by projecting light time-sequentially from multiple light sources onto the object.

Non-Patent Document No. 1 discloses a gesture interface system for detecting a human hand's motion with a near-infrared ray, and says that a human being's skin exhibits a higher reflectance to an infrared ray with a wavelength of 870 nm than to an infrared ray with a wavelength of 970 nm.

CITATION LIST

Patent Literature

Patent Document No. 1: Japanese Laid-Open Patent Publication No. 2001-12909

Non-Patent Literature

Non-Patent Document No. 1: Mariko Takeuchi, Kunihito Kato and Kazuhiko Yamamoto, "Establishing Gesture Interface System Using Near-Infrared Skin Detection", the Institute of Image, Information and Television Engineers (ITE) Technical Report Vol. 34, No. 34, ME 2010-122 (August 2010)

SUMMARY OF INVENTION

Technical Problem

According to the conventional technologies, the accuracy or sensitivity of the distance measured may decline depending on the position of the object. Thus, an embodiment of the present disclosure provides a novel motion sensor device which can overcome such a problem with the conventional technologies.

Solution to Problem

A motion sensor device according to an aspect of the present disclosure includes: an image sensor; first, second and third light sources; and a controller configured to control the image sensor and the first to third light sources. The controller is configured to: make the image sensor capture a first frame with light emitted from the first light source at a first time; make the image sensor capture a second frame with light emitted from the second light source at a second time; make the image sensor capture a third frame with light emitted from the third light source at a third time; generate a first piece of estimated distance information based on a ratio of a luminance of an object obtained from a first image produced by capturing the first frame to a luminance of the object obtained from a second image produced by capturing the second frame; generate a second piece of estimated distance information based on a ratio of the luminance of the object obtained from the first image to a luminance of the object obtained from a third image produced by capturing the third frame; and obtain information about a distance to the object by either choosing one from, or synthesizing together, the first and second pieces of estimated distance information.

A motion sensor device according to another aspect of the present disclosure includes: an image sensor which is able to detect light with a first wavelength and light with a second wavelength that is different from the first wavelength; first and second light sources which emit light with the first wavelength; third and fourth light sources which emit light with the second wavelength; and a controller which is configured to control the image sensor and the first to fourth light sources. The controller is configured to: make the image sensor capture a first frame with light emitted from the first and fourth light sources at a first time; make the image sensor capture a second frame with light emitted from the second and third light sources at a second time; generate a first piece of estimated distance information based on a ratio of a luminance of a first wavelength component of an object obtained from a first image produced by capturing the first frame to a luminance of the first wavelength component of the object obtained from a second image produced by capturing the second frame; generate a second piece of estimated distance information based on a ratio of a luminance of a second wavelength component of the object obtained from the first image to a luminance of the second wavelength component of the object obtained from the second image; and obtain information about the distance to the object by either choosing one from, or synthesizing together, the first and second pieces of estimated distance information.

A motion sensor device according to still another aspect of the present disclosure includes: an image sensor; first, second and third light sources; and a controller configured to control the image sensor and the first to third light sources. The controller is configured to: make the image sensor capture a first frame with light emitted from the first light source at a first time; make the image sensor capture a second frame with light emitted from the second light source at a second time; and make the image sensor capture a third frame with light emitted from the third light source at a third time, and wherein luminances of an object obtained from first, second and third images produced by capturing the first, second and third frames are called first, second and third luminances, respectively, the controller is configured to obtain information about the distance to the object based on a ratio of a fourth luminance which is obtained by either synthesizing together, or choosing one from, the first and third luminances to the second luminance.

A motion sensor device according to yet another aspect of the present disclosure includes: an image sensor which is able to detect light with a first wavelength and light with a second wavelength that is different from the first wavelength; first and second light sources which emit light with the first wavelength; third and fourth light sources which emit light with the second wavelength; and a controller which is configured to control the image sensor and the first to fourth light sources. The controller is configured to: make the image sensor capture a first frame with light emitted from the first and fourth light sources at a first time; and make the image sensor capture a second frame with light emitted from the second and third light sources at a second time, and wherein luminances of the first wavelength component of the object obtained from the first and second images produced by capturing the first and second frames are called first and second luminances, respectively, and luminances of the second wavelength component of the object obtained from the first and second images are called third and fourth luminances, respectively, the controller is configured to obtain information about the distance to the object based on a ratio of a fifth luminance which is obtained by either choosing one from, or synthesizing together, the first and second luminances to a sixth luminance which is obtained by either choosing one from, or synthesizing together, the third and fourth luminances.

An electronic device according to the present disclosure includes: a motion sensor device according to any of the embodiments described above; and a display which changes what to present thereon in response to an object's motion detected by the motion sensor device.

An integrated circuit according to the present disclosure is to be used in a motion sensor device according to any of the embodiments described above, and includes: a timing controller which is connected to the image sensor and the light sources to control timings of exposure and light emission; an extreme value searching section which processes image capturing data to search an area with a relatively high luminance; a coordinate memory which stores the coordinates and luminance of the area that has been searched by the extreme value searching section; and a distance calculating section which calculates estimated distance information based on a luminance ratio by choosing frames that have been shot in the same area under different conditions from data in the coordinate memory.

A distance estimating method according to the present disclosure is performed by a motion sensor device according to any of the embodiments described above, and includes: searching for an extreme value by extracting selectively a range with a relatively high light intensity from data of captured frames and by calculating its coordinates and light intensity; calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

A computer program according to the present disclosure is defined to make a motion sensor device according to any of the embodiments described above perform the steps of: searching for an extreme value by extracting selectively a range with a relatively high light intensity from data of captured frames and by calculating its coordinates and light intensity; calculating the ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

Advantageous Effects of Invention

A motion sensor device according to an embodiment of the present disclosure can prevent errors from being caused in the distance being measured.

BRIEF DESCRIPTION OF DRAWINGS

FIG. 9B A timing chart showing when the light sources and image sensor are activated in the first embodiment of the present disclosure.

DESCRIPTION OF EMBODIMENTS

The basic principle on which the distance to an object (or subject) can be measured by a motion sensor device according to the present disclosure will be described.

Figure 1A:
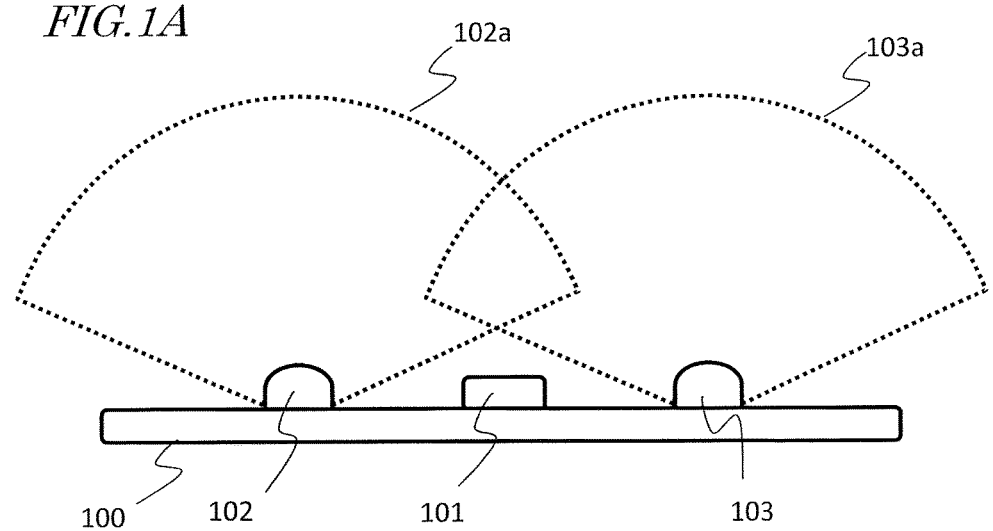
FIG. 1A A cross-sectional view schematically illustrating a cross section of a motion sensor device with two light sources.
Figure 1B:
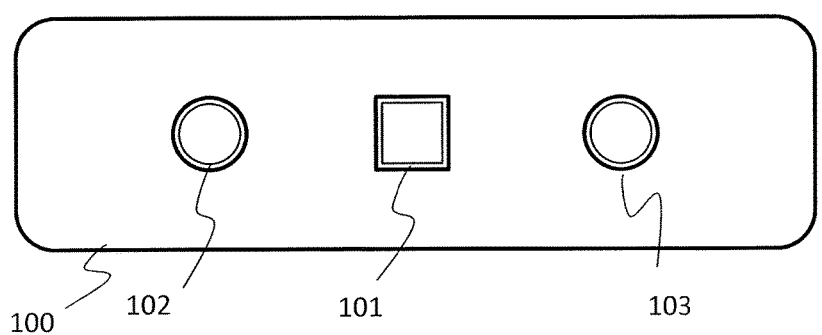
FIG. 1B A top view of the device shown in FIG. 1A.

First of all, look at FIGS. 1A and 1B. FIG. 1A is a cross-sectional view schematically illustrating a cross section of a motion sensor device, and FIG. 1B is a top view of the device shown in FIG. 1A.

The device shown in FIGS. 1A and 1B includes an image sensor 101 which is arranged at its center and two LED light sources 102 and 103 which are arranged on the right- and left-hand sides of the image sensor 101. In the example illustrated in FIGS. 1A and 1B, the image sensor 101 and LED light sources 102, 103 are mounted on a single substrate 100. The image sensor is a solid-state image sensor in which a huge number of very small photosensitive cells (photodiodes) are arranged in columns and rows, and is typically a CCD (charge-coupled device) type or a CMOS type.

In FIG. 1A, illustrated schematically are light 102a emitted from the first light source 102 and light 103a emitted from the second light source 103. This device can measure the distance to an object of measurement (i.e., target) by capturing an image with the LED light sources 102, 103 turned ON alternately. It should be noted that "to measure the distance" will also refer herein to calculating an estimated distance from the image sensor to the object or obtaining an estimated value indicating the object's position in a space. Examples of the objects include a human being's hand(s) or finger(s) and a pen or something else held in his or her hand. The object may be in motion. A three-dimensional motion sensor device which can obtain in real time either the distance to a person's fingertip that is moving at high speeds or an estimated value indicating the fingertip's position may be used as an "input device" in various kinds of electronic devices including computers, tablet terminals, smartphones, game consoles and consumer electronic devices.

Figure 2:
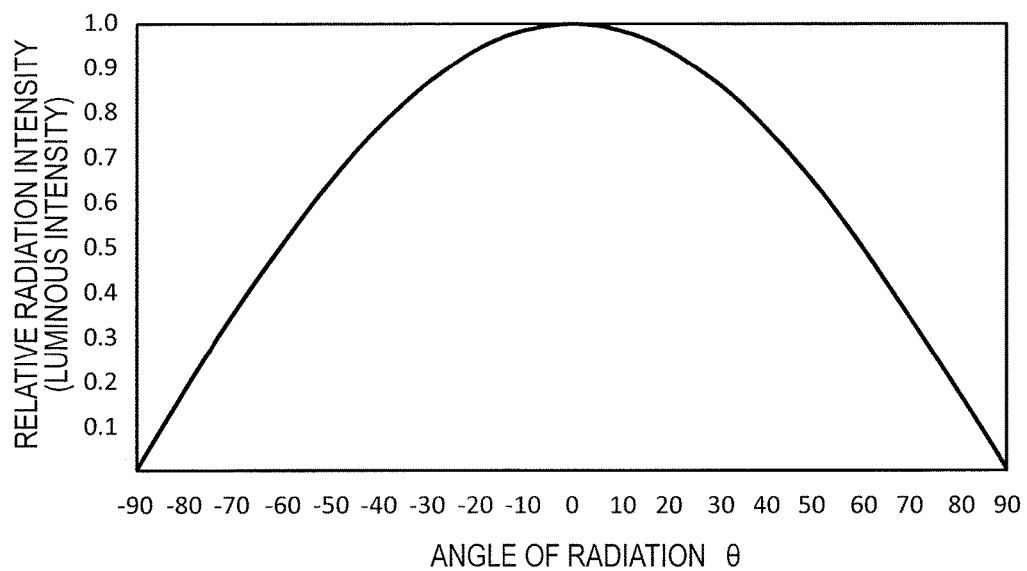
FIG. 2 A graph showing how the relative radiation intensity of an LED light source changes with the angle of radiation.
Figure 3:
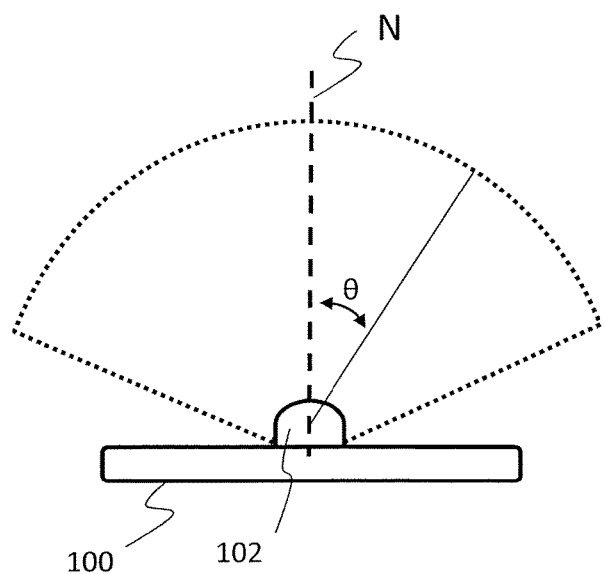
FIG. 3 Illustrates the angle of radiation of an LED light source.

FIG. 2 is a graph showing the radiation pattern (i.e., the light distribution characteristic) of the light emitted from each of the LED light sources 102 and 103. The abscissa of this graph represents the angle θ defined by the radiation direction with respect to a normal N to the substrate 100 as shown in FIG. 3. On the other hand, the ordinate of this graph represents the relative radiation intensity. In the following description, the angle θ defined by the radiation will be sometimes hereinafter referred to as the "angle of radiation". It should be noted that the relative radiation intensity value corresponds to the illuminance of an object which is arranged at a position in a direction that defines a particular angle with respect to the light source (i.e., radiation illuminance).

As can be seen from FIG. 2, the radiation emitted from each of the LED light sources 102 and 103 exhibits the highest intensity when the angle θ is zero degrees. In the example shown in FIG. 2, the LED light sources 102 and 103 have a light distribution characteristic, of which the radiation intensity can be approximated by $I_0 \times \cos \theta$. However, the LED light sources 102 and 103 do not have to have the light distribution characteristic shown in FIG. 2. In addition, the radiation emitted from the LED light sources 102 and 103 does not have to be visible light but may also be an electromagnetic wave such as an infrared ray which falls within a wavelength range to which the human vision is insensitive. In this description, the radiation emitted from a light source will be sometimes simply referred to as "light" for the sake of simplicity. This term "light" does not have to be visible light but may also refer to any of various kinds of electromagnetic waves which can be detected by the image sensor.

Next, it will be described how the device described above measures the distance to the object.

Figure 4A:
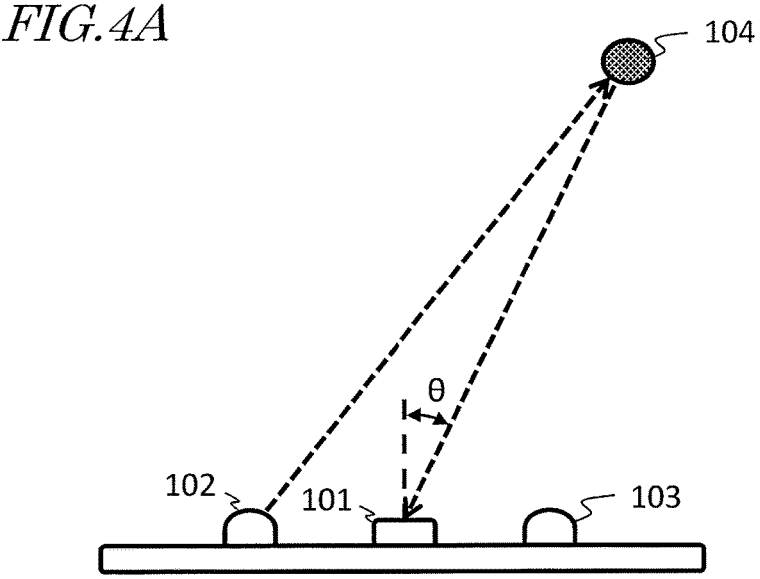
FIG. 4A Illustrates how an object 104 is irradiated with light that has been emitted from a first LED light source 102.
Figure 4B:
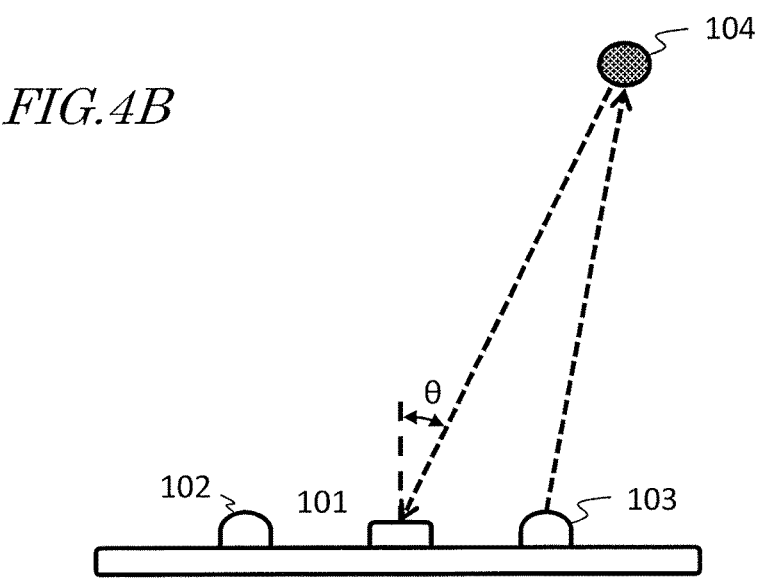
FIG. 4B Illustrates how an object 104 is irradiated with light that has been emitted from a second LED light source 103.

First of all, look at FIGS. 4A and 4B. FIG. 4A illustrates how the object 104 is irradiated with light that has been emitted from the first LED light source 102 and how part of the light reflected from the object 104 is incident on the image sensor 101. On the other hand, FIG. 4B illustrates how the object 104 is irradiated with light that has been emitted from the second LED light source 103 and how part of the light reflected from the object 104 is incident on the image sensor 101. The object 104 is supposed to be located at substantially the same position in both of FIGS. 4A and 4B.

At a first time, this device gets a first shooting session done by the image sensor 101 with the LED light source 102 turned ON and the LED light source 103 turned OFF as shown in FIG. 4A. Next, at a second time, the device gets a second shooting session done by the image sensor 101 with the LED light source 103 turned ON and the LED light source 103 turned OFF as shown in FIG. 4B. The durations (i.e., exposure times) of the first and second shooting sessions are supposed to be short enough to be able to handle the object 104 as substantially a still object.

When the first shooting session is carried out, part of the light emitted from the LED light source 102 is reflected from the object 104 and incident on the image sensor 101. As a result, a luminance image corresponding to the intensity of the light incident on the image sensor 101 is obtained. In the same way, when the second shooting session is carried out, part of the light emitted from the LED light source 103 is reflected from the object 104 and incident on the image sensor 101. As a result, a luminance image corresponding to the intensity of the light incident on the image sensor 101 is obtained.

The object's (104) luminance (which is either its luminance distribution or luminance image) can be obtained based on the two image frames captured as a result of the first and second shooting sessions. In this description, the "luminance" does not refer herein to a psychophysical quantity with the unit [candela/m$^2$] but refers herein to a "relative luminance" to be determined for each pixel of the image sensor and corresponds to the quantity of light or quantity of radiation. Each of the pixels that form each image frame has a "luminance value" corresponding to the quantity of light that the pixel has received.

Since the object 104 has its own size, each image representing the object 104 is usually comprised of multiple pixels. The "luminance" of the object 104 can be determined by various methods based on the luminance values of those pixels that form the object (104) image. For example, the luminance of the brightest "pixel" or "pixel block" of the object (104) image may be regarded as the luminance of the object 104. Or the average luminance of all pixels that form the object (104) image may be regarded as the luminance of the object 104.

Figure 5:
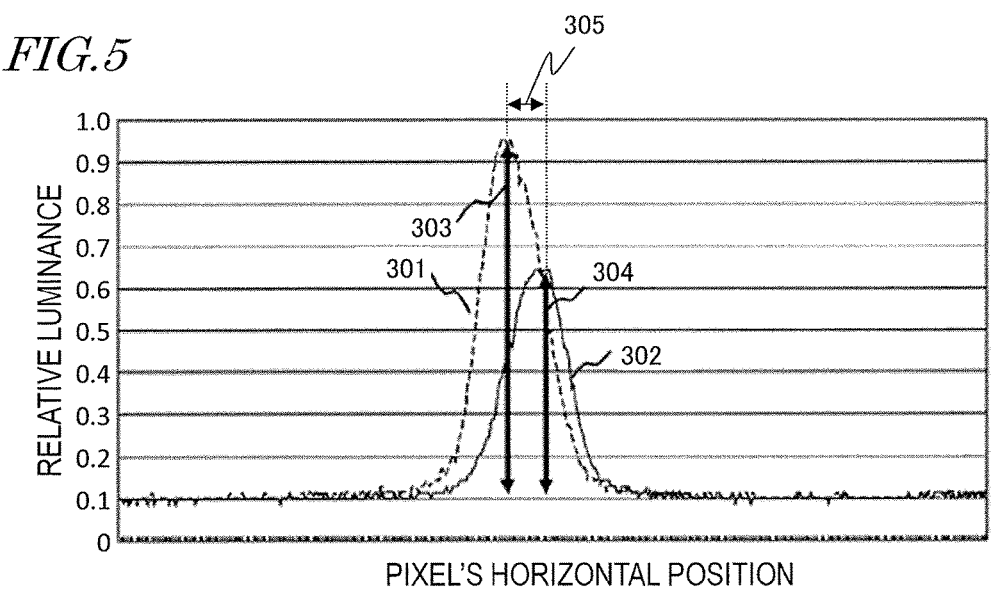
FIG. 5 A graph showing how the luminance of image capturing data changes with a pixel location on a line.

FIG. 5 is a graph showing the luminance value of a single horizontal line that runs across the object (104) image in each of the two image frames that have been obtained by the method described above. The abscissa indicates the location of a pixel on a particular horizontal line in the image, and the ordinate indicates the luminance. In this graph, the curve 301 represents the luminance when the LED light source 102 is ON, and the curve 302 represents the luminance when the LED light source 103 is ON.

In the example shown in FIG. 5, each of the curves 301 and 302 has a single peak. Specifically, the curve 301 has an extreme value 303 at a certain pixel location, and the curve 302 has an extreme value 304 at another pixel location. The horizontal interval between the respective coordinates of the extreme values 303 and 304 of the curves 301 and 302 is indicated by the width 305.

As described above, the object 104 is substantially standing still between the two frames. Thus, the difference is made between the curves 301 and 302 because the radiation produced by the LED light source 102 has a different pattern from the radiation produced by the LED light source 103. The ratio of the luminance of the image captured by making the light emitted from the LED light source 102 and then reflected from the object 104 be incident on the image sensor 101 to that of the image captured by making the light emitted from the LED light source 103 and then reflected from the object 104 be incident on the image sensor 101 depends on the relation between the distance from the LED light source 102 to the object 104 and the distance from the LED light source 103 to the object 104.

Figure 6:
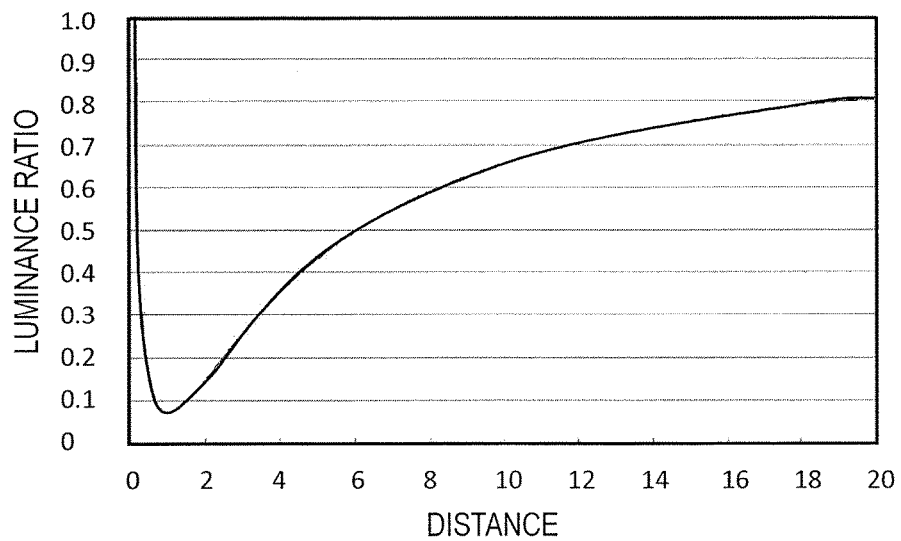
FIG. 6 A graph showing how the luminance ratio changes with the distance at a certain angle of radiation.

The distance to the object can be measured based on the ratio of the luminances of the images captured. FIG. 6 is a graph showing an exemplary relation between the distance and the luminance ratio in a direction which defines an angle of 45 degrees with respect to the image sensor 101. In the graph shown in FIG. 6, the abscissa indicates the relative distance to the object and the ordinate indicates the luminance ratio in a situation where LED light sources with the characteristic shown in FIG. 2 are arranged on the right- and left-hand sides at a predetermined distance from the image sensor 101. The "distance" on the axis of abscissas is measured based on the distance between the image sensor 101 and the LED light source, and a distance of "1" is equal to the distance between the image sensor 101 and the LED light source.

The object's luminance (or illuminance) attenuates inversely proportionally to the square of the distance from the LED light source to the object. Thus, the luminance ratio varies according to the distance. Since the radiation characteristic shown in FIG. 2 is already known, the distance can be detected or estimated accurately based on this radiation characteristic.

FIG. 6 shows an exemplary relation between the distance and the luminance ratio when the radiation angle θ is 45 degrees. The relations between the distance and the luminance ratio can be obtained in advance in the same way with respect to multiple different angles, too. The object's angle can be obtained based on the position of the object to be captured by the image sensor.

As can be seen from FIG. 6, if the distance between the object and the image sensor is longer than approximately one, the distance can be measured based on the ratio of the extreme values 303 and 304.

In the example described above, light sources, of which the relative radiation intensity changes with the radiation angle, are used. However, this measuring method can also be adopted even when light sources that do not have such a characteristic are used. Unless light sources which emit parallel light rays are used, the intensity of the light should have some light distribution characteristic in a three-dimensional space. That is why such light sources can also be used to measure the distance. For example, even in "point light sources" of which the light distributions are isotropic, the illuminance and luminance on the object also attenuate inversely proportionally to the square of the distance from the light sources. Thus, even such light sources can also be said to be light sources having different radiation patterns in a three-dimensional space.

Figure 7A:
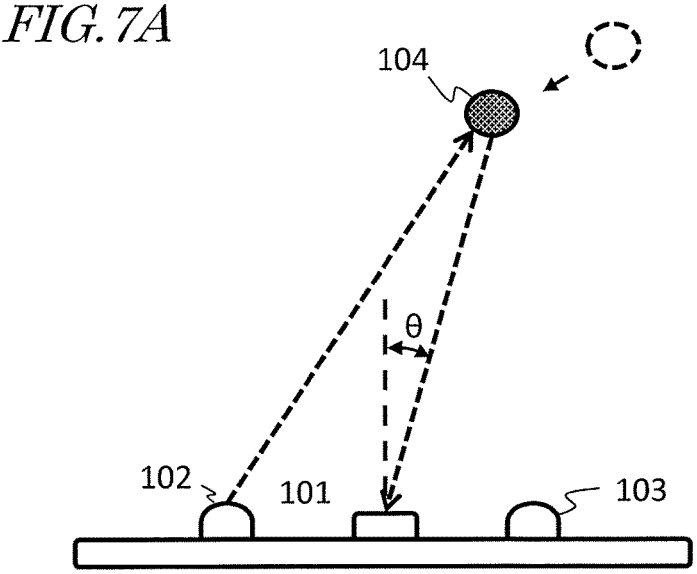
FIG. 7A Illustrates how an object 104 that has moved slightly is irradiated with the light emitted from the first LED light source 102.
Figure 7B:
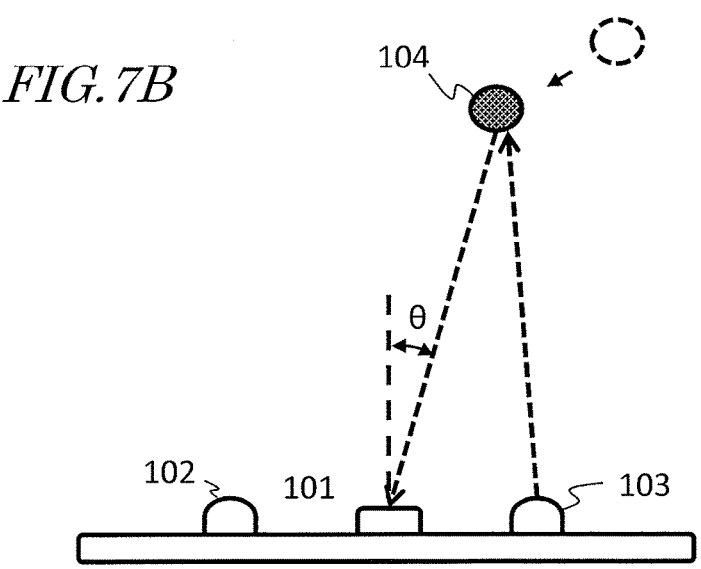
FIG. 7B Illustrates how the object 104 that has moved slightly is irradiated with the light emitted from the second LED light source 103.

Next, look at FIGS. 7A and 7B, which illustrate how a shooting session is performed on the object 104 that has moved from the position shown in FIGS. 4A and 4B. As long as an image can be captured and the distance can be estimated quickly, even the distance to a moving object can also be measured by the method described above. By illuminating the object with the light sources 102 and 103 alternately and capturing the object image using the image sensor 101 repeatedly a number of times, the position of the moving object 104 can be detected. As a result, the change in the position of the object 104, or its motion, can be detected.

The present inventors discovered that in a range where the distances from the two LED light sources 102 and 103 to the object 104 were equal to each other, the device described above could measure the distance less accurately. Such a range will be hereinafter referred to as a "low sensitivity range". If the distance on the axis of abscissas in the graph shown in FIG. 6 is equal to or smaller than one, the shorter the distance, the higher the luminance ratio gets. That is why the decision cannot be made, just by the luminance ratio, whether or not the object is located at a "close range" where the distance to the object is equal to or smaller than one.

Figure 8:
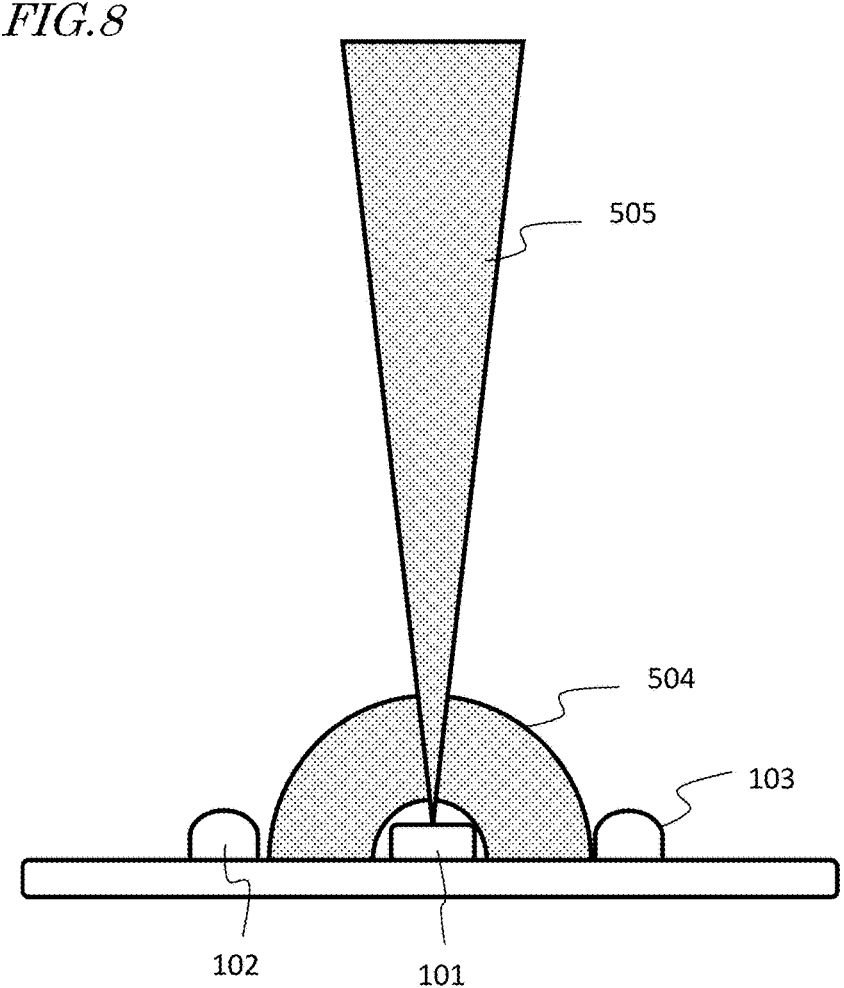
FIG. 8 Schematically illustrates a sensitivity range of a motion sensor device with two light sources.

FIG. 8 schematically illustrates low-sensitivity ranges for the device described above. In FIG. 8, illustrated are a low-sensitivity range 504 to be produced when the distance is too short and a low-sensitivity range 505 to be produced when the luminance ratio becomes close to one, irrespective of the distance.

According to embodiments of the present disclosure to be described below, it is possible to prevent the results of measurement from losing stability in those low-sensitivity ranges.

Embodiment 1

A first embodiment of a motion sensor device according to the present disclosure will be described. A motion sensor device according to this embodiment includes three light sources.

Figure 9A:
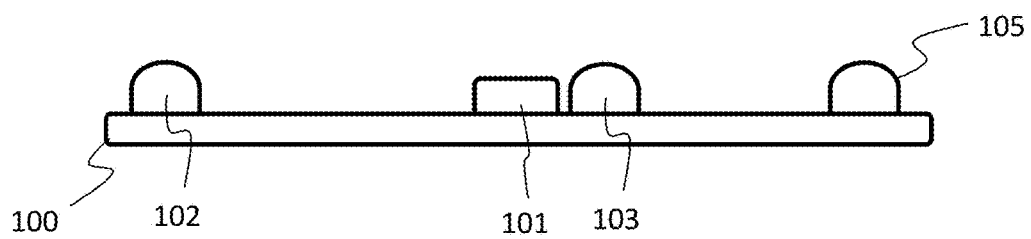
FIG. 9A Illustrates an arrangement of a light source unit and an image sensor in a light source unit according to a first embodiment of the present disclosure.

FIG. 9A schematically illustrates an exemplary arrangement of light sources in a motion sensor device including three light sources (which will be hereinafter referred to as first, second and third light sources 102, 103 and 105, respectively). FIG. 9B is a timing chart showing the timings for this motion sensor device to control the light sources and the image sensor. First of all, it will be described with reference to FIGS. 9A and 9B why such a problem that the results of measurement would lose stability in the low-sensitivity ranges can be overcome by adopting the configuration of this embodiment.

The periods 802, 803 and 804 shown in FIG. 9B correspond to the periods in which the LED light sources 102, 103 and 105 are respectively turned ON. The first, second and third exposure periods 805, 806 and 807 correspond to the respective periods in which first, second and third frames are captured by the image sensor 101. Although the LED light sources 102, 103 and 105 are supposed to be turned ON in this order in the timing chart shown in FIG. 9B, the LED light sources may also be turned ON in any arbitrary order. Nevertheless, if the period in which the LED light source 102 is turned ON is defined to be the middle one of those periods in which the three light sources are respectively turned ON, decrease in measuring accuracy due to the object's motion can be minimized effectively.

An ordinary image sensor captures a single frame per exposure process, has image data thus obtained retrieved by an external device, and then captures the next frame. That is to say, an image data reading operation is performed on a frame-by-frame basis. With such an image sensor, in the interval after an exposure process for the $n^{th}$ frame (where n is an integer) has been finished and before an exposure process for the $(n+1)^{th}$ frame is started, it will take some time to get the operation of transferring every electric charge obtained by capturing the $n^{th}$ frame and outputting it to an external device done.

On the other hand, according to this embodiment, as soon as the first exposure period 805 ends, the second exposure period 806 begins as shown in FIG. 9B. The electric charges of respective pixels which have been generated by capturing the first frame in the first exposure period 805 are transferred to, and stored in, a storage section before the second exposure period 806 begins. Likewise, as soon as the second exposure period 806 ends, the third exposure period 807 begins. The electric charges of respective pixels which have been generated by capturing the second frame in the second exposure period 806 are transferred to, and stored in, another storage section before the third exposure period 807 begins. After that, a signal representing the electric charges stored in those storage sections and the electric charges generated in the third exposure period 807 is read and output to an external device in the period Tt.

According to this embodiment, if the length of the first to third exposure periods is Te, the data of three image frames is retrieved at a rate to be determined by (1/Tf) which is the inverse number of Tf that is as long as 3×Te+Tt.

The period of time Tt varies depending on the number of pixels but may be set to be approximately 20 milliseconds with the data transfer rate taken into account. On the other hand, the period of time Te may be set to be as short as 1 millisecond or less, e.g., 25 microseconds. If three frames are sequentially captured within a short period of time, even the distance to an object that is moving at high speeds (such as a person's fingertip) can also be measured. For example, if 3×Te is 75 microseconds, even an object that is moving at a speed of 1 meter per second will move only 0.075 millimeters while the first to third frames are captured. On the other hand, if those frames are captured at a normal frame rate (of 60 frames per second, for example), then the object will move as much as 50 millimeters in that period. Even if the object is shot at as high speeds as 1000 frames per second, the object will still move 3 millimeters in that period. Since the period of time after the first frame has started and until the third frame ends can be shortened to 3 milliseconds or less according to this embodiment, such a device can be used as a motion sensor device in various kinds of applications.

According to the configuration of this embodiment, the distance to the object can be calculated based on two out of the three images that have been captured as the first to third frames. There are three different combinations of two images that can be chosen from given three images. And the positions of the low-sensitivity range are different from each other in those three combinations. By using those two or three different pairs of images, the low-sensitivity range can be removed. According to this embodiment, the low-sensitivity range is supposed to be removed mainly by using two images captured as the first and second frames and two images captured as the second and third frames.

Figure 10:
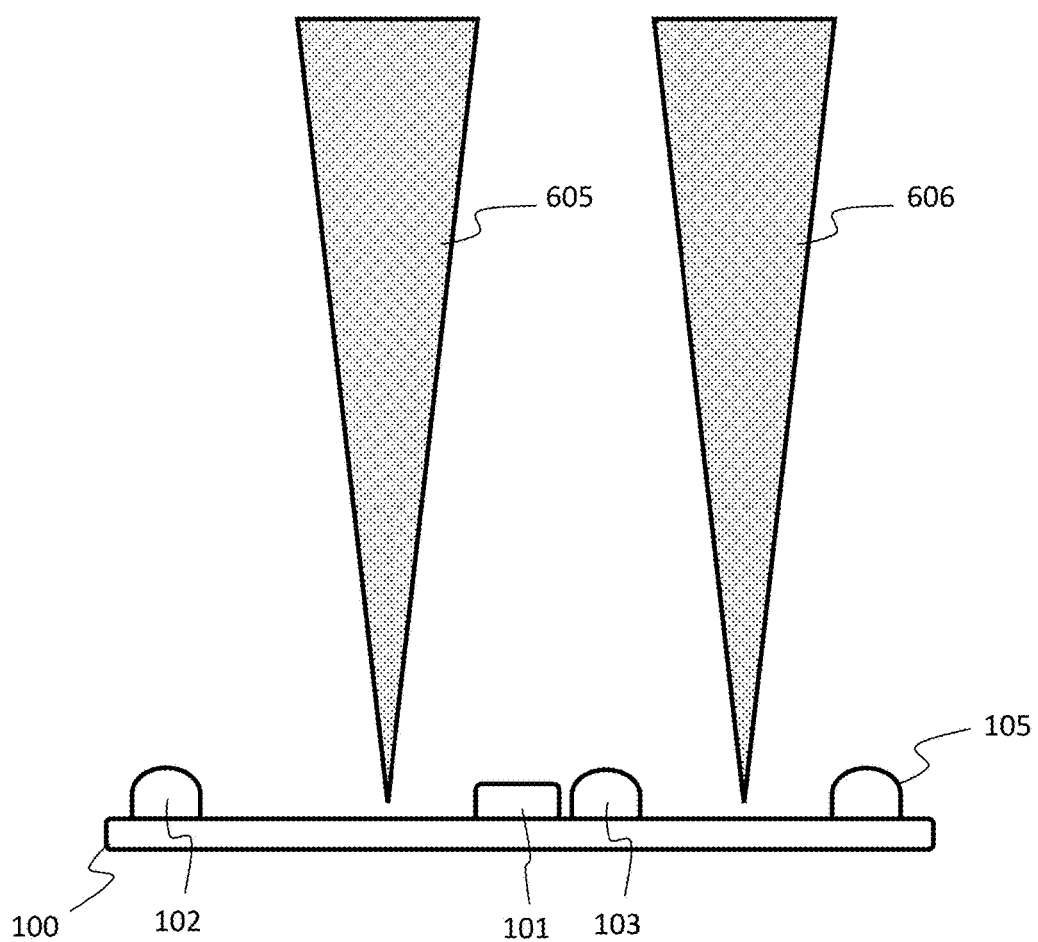
FIG. 10 Illustrates low-sensitivity ranges according to the first embodiment of the present disclosure.

FIG. 10 schematically illustrates a low-sensitivity range to be produced in a situation where distance information has been collected from two images that have been captured as first and second frames and a low-sensitivity range to be produced in a situation where distance information has been collected from two images that have been captured as second and third frames. If the distance to the object is calculated based on two images that have been captured as the first and second frames, the low-sensitivity range 605 is produced around an a point that is located at equal distances from the light sources 102 and 103. On the other hand, if the distance to the object is calculated based on two images that have been captured as the second and third frames, the low-sensitivity range 606 is produced around an a point that is located at equal distances from the light sources 103 and 105. Since the light source 103 is arranged according to this embodiment in the vicinity of the image sensor 101, no low-sensitivity range such as the one 504 shown in FIG. 8 will be produced at a close range.

The luminance of a frame which has been captured within a sufficiently short time under intense light emitted is substantially proportional to the intensity of the reflected light. The luminances of the object that has been shot as the first, second and third frames will be hereinafter referred to as first, second and third luminances, respectively. The respective luminances are determined by the angles and distances that are defined by the relative positions of the object to the respective light sources. As described above, the distance to the object can be estimated based on the ratio of these luminances.

If the first and second luminances are compared to each other, these luminances will turn out to be substantially equal to each other (i.e., their luminance ratio will be close to one) in the low-sensitivity range 605, and therefore, the distance measuring accuracy will decline there. If the second luminance is greater than the first luminance, probably the object would be located on the right-hand side of the low-sensitivity range 605 (i.e., closer to the light source 103). Conversely, if the first luminance is greater than the second luminance, probably the object would be located on the left-hand side of the low-sensitivity range 605 (i.e., closer to the light source 102).

On the other hand, if the second and third luminances are compared to each other, these luminances will turn out to be substantially equal to each other (i.e., their luminance ratio will be close to one) in the low-sensitivity range 606, and therefore, the distance measuring accuracy will decline there. If the second luminance is greater than the third luminance, probably the object would be located on the left-hand side of the low-sensitivity range 606 (i.e., closer to the light source 103). Conversely, if the third luminance is greater than the second luminance, probably the object would be located on the right-hand side of the low-sensitivity range 606 (i.e., closer to the light source 105).

In view of these considerations, the motion sensor device of this embodiment gets a first piece of estimated distance information based on the ratio of the first and second luminances, gets a second piece of estimated distance information based on the ratio of the second and third luminances, and either chooses one from, or combines together, these two pieces of information, thereby generating information about the distance to the object. For example, if the ratio of the first and second luminances falls within a preset range, the device obtains information about the distance to the object based on only the second piece of estimated distance information. On the other hand, if the ratio of the second and third luminances falls within a preset range, the device obtains information about the distance to the object based on only the first piece of estimated distance information. In this description, the "preset range" may be a predetermined range close to one (e.g., from 0.8 to 1.2). Also, the situations where the "ratio" of the two luminances "falls within a preset range" are supposed to include a situation where not the "ratio" but the "difference" between the two luminances falls within a preset range.

Alternatively, the first piece of estimated distance information may be used only when the second luminance is greater than the first luminance, and the second piece of estimated distance information may be used only when the second luminance is greater than the third luminance. The decision whether or not one luminance is greater than the other can be made by either seeing if the absolute value of their difference is greater than a predetermined threshold value or seeing if the difference between their ratio and one is greater than a predetermined threshold value. By performing such a control, even if the object is located in the low-sensitivity range 605 or 606, the distance to the object can be measured based on one of the two pieces of estimated distance information. Optionally, although not adopted in this embodiment, estimated distance information may also be obtained based on a result of comparison between the first and third luminances.

As for a range where both of the first and second pieces of estimated distance information have high sensitivity, the synthesis may be made by calculating their average with some weight added to them. By performing such processing, the distance can be measured with high sensitivity and with the low-sensitivity ranges removed.

As for the LED light source 103 to be arranged near the image sensor 101, either its luminous intensity (radiation intensity) or luminous flux (radiant flux) value may be decreased or its radiation angle may be set to be a narrower one. Consequently, an inexpensive low-output LED light source can be used as the LED light source 105. And by adopting such a light source, an increase in the cost of parts and power dissipation can be checked. That is to say, according to this embodiment, just by adding a single LED light source of a relatively low price, a motion sensor device with less low-sensitivity range is realized.

In addition, according to this embodiment, by using a rather expensive image sensor which can capture three frames sequentially, either the distance to an object that is moving at high speeds or the three-dimensional motion of such an object can be detected. If the motion velocity of the object of measurement is expected to be sufficiently low, an ordinary one-frame-exposure image sensor may be used.

Next, the configuration and operation of a motion sensor device according to this embodiment will be described in further detail with reference to FIGS. 11, 12 and 13.

Figure 11:
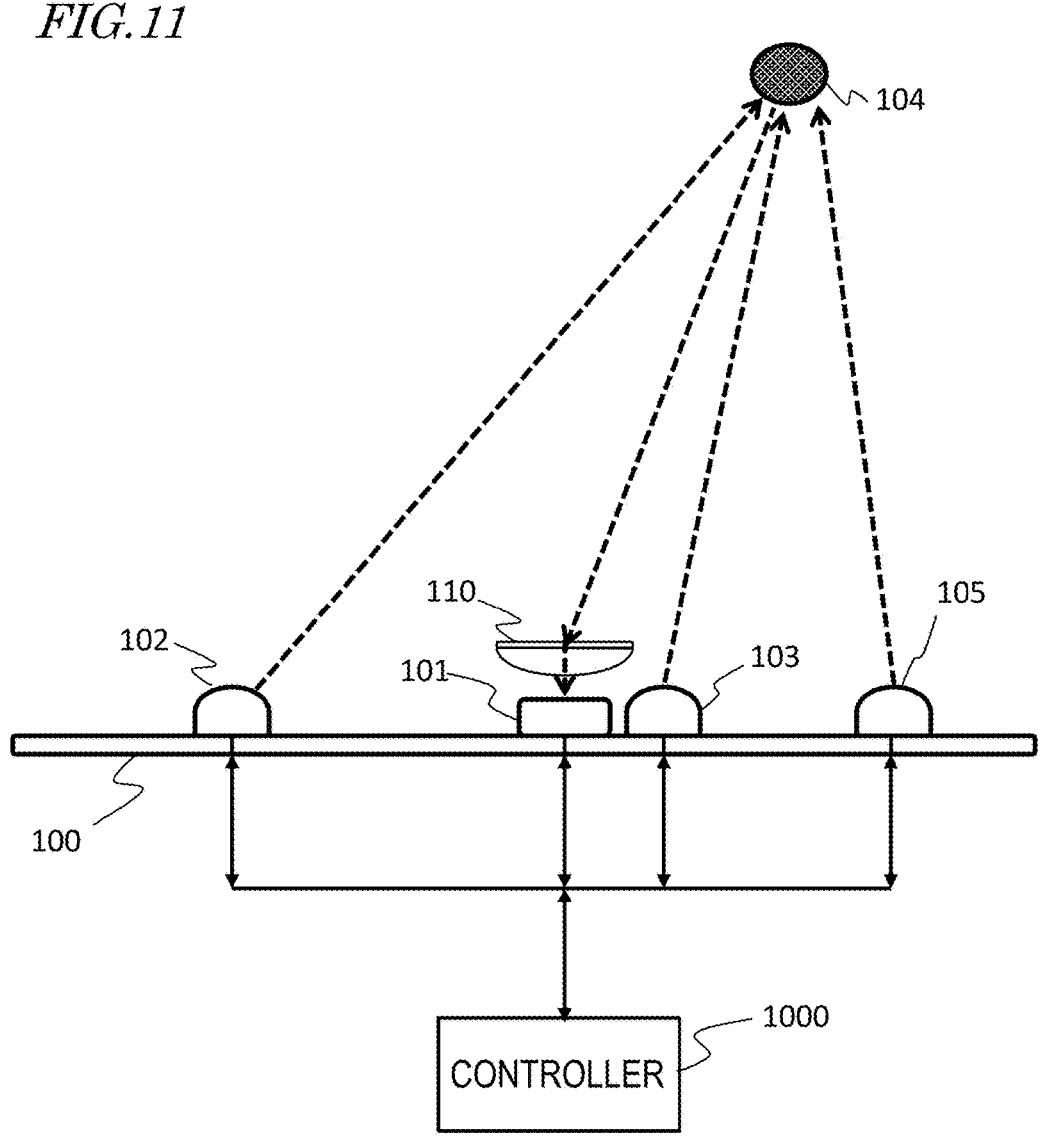
FIG. 11 Illustrates a configuration for a motion sensor device according to the first embodiment of the present disclosure.

FIG. 11 schematically illustrates a configuration for a motion sensor device according to this embodiment. This device includes an image sensor 101, a lens system 110 which produces a subject image on the imaging surface of the image sensor 101, three LED light sources 102, 103 and 105, and a controller 1000 which is configured to control the image sensor 101 and the LED light sources 102, 103 and 105. The image sensor 101 and LED light sources 102, 103 and 105 are mounted on a substrate 100. Part or all of the controller 1000 may be mounted on the substrate 100 or on another substrate. Alternatively, the function of the controller 1000 may be partially performed by a device which is arranged at a distant location.

The LED light source 103 is arranged closer to the image sensor 101 than any other LED light source. Suppose the directions in which the LED light sources 102 to 105 are located with respect to the image sensor 101 are first, second and third directions, respectively, and the distances to the LED light sources 102 to 105 from the image sensor 101 are first, second and third distances, respectively. The second and third directions are opposite from the first direction. And the second distance is shorter than any of the first and third distances. In this embodiment, the second and third distances are set to be equal to each other.

The LED light sources 102, 103 and 105 are all configured to emit light falling within the same wavelength range. The image sensor 101 is configured to detect at least light falling within a particular wavelength range in the light emitted from the LED light sources 102, 103 and 105. As the LED light sources 102, 103 and 105, ones that emit invisible light such as a near-infrared ray can be used effectively from the standpoint of practice use. However, in applications in which there is no problem even if visible light is emitted (e.g., in industrial applications), the LED light sources 102, 103 and 105 may also be implemented to emit visible light. The light sources do not have to be LED light sources but may also be point light sources or any other kind of light sources with a three-dimensionally biased intensity distribution. In the following description, the LED light sources 102, 103 and 105 are supposed to be configured to emit light with a first wavelength (of 800 nm, for example) which is a near-infrared ray, and the image sensor 101 is supposed to be configured to detect the light with the first wavelength.

In this description, the "near-infrared range" refers herein to a wavelength range of about 700 nm to about 2.5 μm. Also, the "near-infrared ray" refers herein to light (electromagnetic wave), of which the wavelength falls within the near-infrared range. Furthermore, "to emit light with the first wavelength" herein means emitting light falling within a broad wavelength range including the first wavelength. In this embodiment, the light sources 102, 103 and 105 do not have to emit light falling within exactly the same wavelength range, but their wavelength ranges may be slightly different from each other as long as the distance can be measured based on the luminance ratio.

According to this embodiment, by using the light sources 102 and 103, the distance to an object which is located just on the left-hand side of the image sensor 101 or anywhere on the right-hand side of the image sensor 101 can be measured with good stability. Meanwhile, by using the light sources 103 and 105, the distance to an object which is located just on the right-hand side of the light source 103 or anywhere on the left-hand side of the light source 103 can be measured with good stability. In this manner, by using the luminance ratio obtained by the light sources 102 and 103 and the luminance ratio obtained by the light sources 103 and 105, the distance can be detected with much more stability with the low-sensitivity range eliminated.

The image sensor 101 includes a storage section which temporarily stores electric charges on a pixel-by-pixel basis. Thus, even before image data obtained by capturing an $n^{th}$ frame is retrieved, an $(n+1)^{th}$ frame can be captured. If an increased number of storage sections are provided inside the image sensor 101, the exposure process can be carried out on three or more frames continuously. The image sensor 101 may be a special kind of sensor which can carry out the exposure process on even-numbered lines and on odd-numbered lines separately from each other. Although the image sensor of this embodiment is supposed to be a CMOS image sensor or a CCD image sensor, this is only an example and any other kind of image sensor may also be used.

The controller 1000 is configured to make the image sensor 101 capture a first frame with light emitted from the first light source 102 at a first time, make the image sensor 101 capture a second frame with light emitted from the second light source 103 at a second time, and make the image sensor 101 capture a third frame with light emitted from the third light source 105 at a third time. And the controller 1000 is configured to obtain information about an estimated distance to the object 104 based on multiple images generated by capturing the first to third frames.

Figure 12:
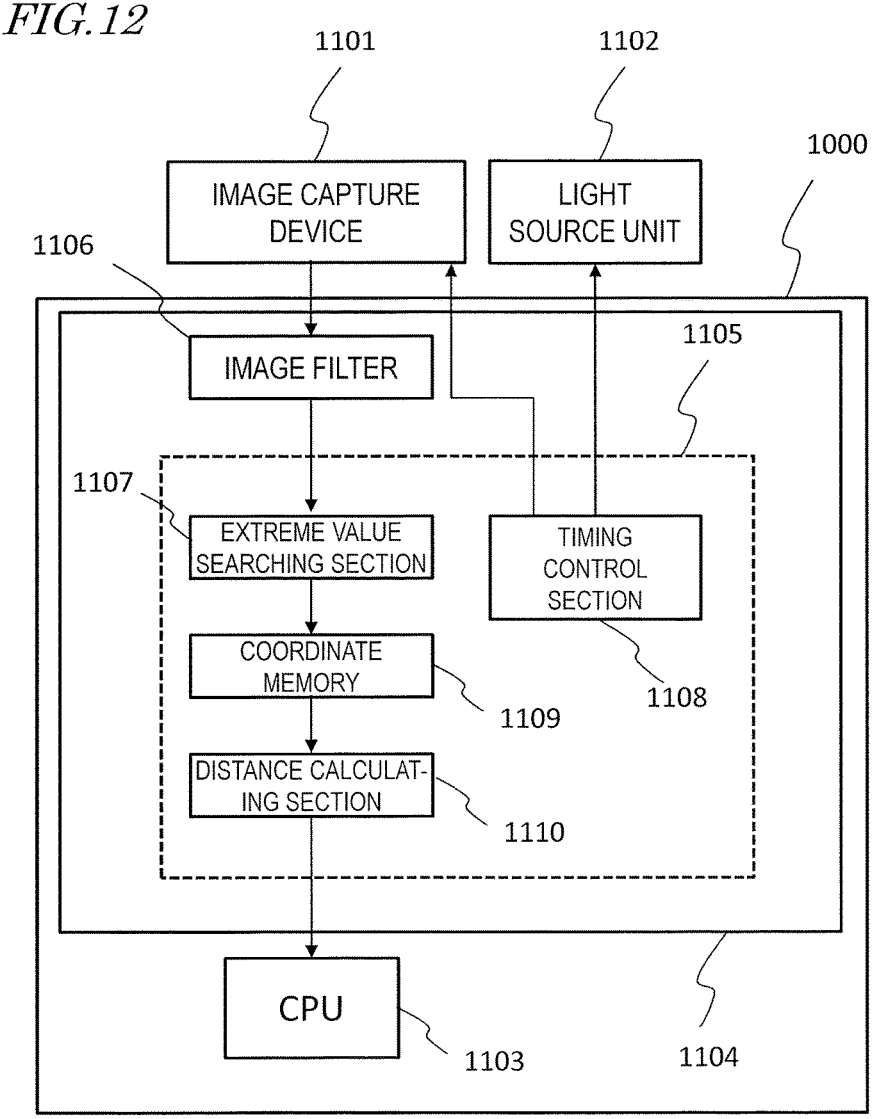
FIG. 12 A block diagram illustrating an exemplary configuration for a motion sensor device according to the first embodiment of the present disclosure.
Figure 13:
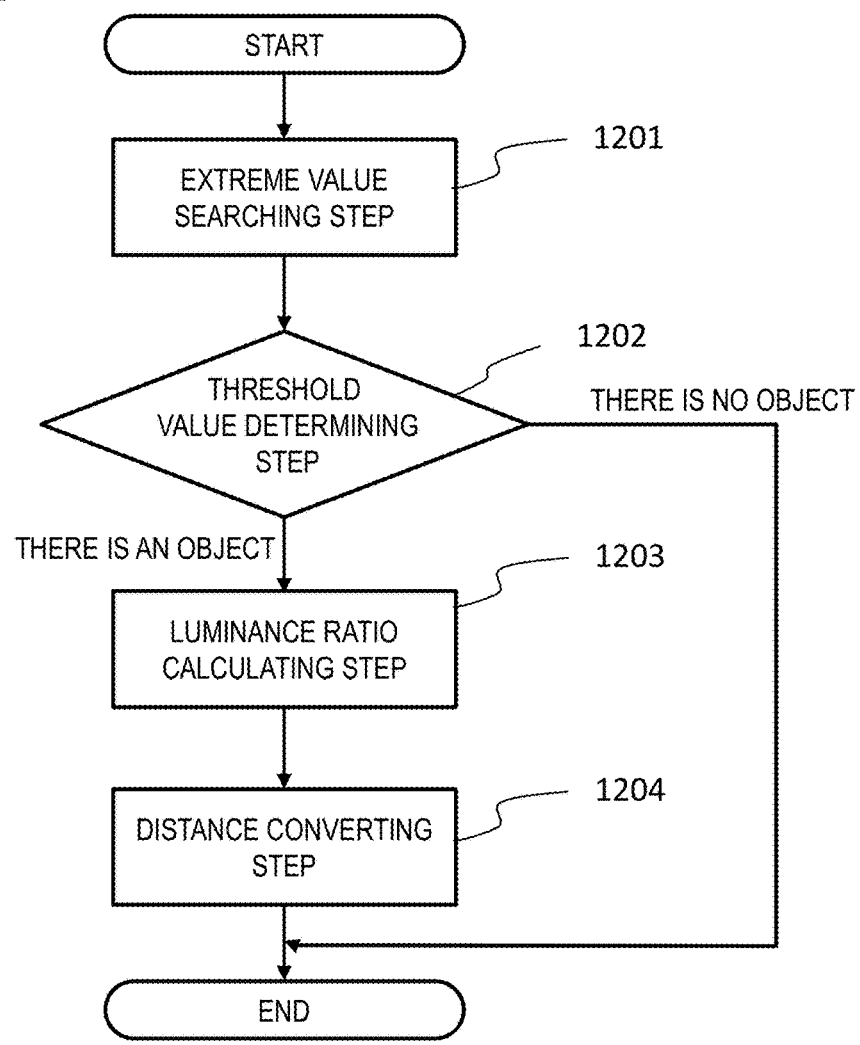
FIG. 13 A flowchart showing the procedure of calculating the distance according to the first embodiment of the present disclosure.

FIG. 12 is a block diagram illustrating an exemplary configuration for a motion sensor device according to this embodiment.

The image capture device 1101 is a single-lens image capture device and includes the image sensor 101 and lens system 110 shown in FIG. 11. The lens system 110 may be a set of lenses which are arranged on the same optical axis. The light source unit 1102 includes the light sources 102, 103 and 105 shown in FIG. 11.

The controller 1000 of this embodiment includes a CPU 1103 and a semiconductor integrated circuit 1104, which includes a distance calculating block 1105 and an image filter block 1106. The distance calculating block 1105 includes an extreme value searching section 1107, a timing controller 1108, a coordinate memory 1109, and a distance calculating section 1110.

Each of the light sources 102, 103 and 105 of this embodiment is an LED light source, and satisfies the relation between the angle of radiation and the relative radiation intensity shown in FIG. 2. It should be noted that to carry out the present disclosure, the relative radiation intensity of these light sources 102, 103 and 105 does not have to change with the angle of radiation. Actually, however, a lot of light sources have a relative radiation intensity which changes with the angle of radiation. That is why this point is taken into consideration according to this embodiment.

In this embodiment, the timing controller 1108 shown in FIG. 12 sends a signal instructing that the LED light source 102 be turned ON to the light source unit 1102. Meanwhile, the timing controller 1108 sends a signal instructing that an exposure process be carried out by the image sensor 101 to the image capture device 1101. In this manner, an image is captured in the first frame with the light source 102 turned ON and sent to the semiconductor integrated circuit 1104.

Next, the timing controller 1108 sends a signal instructing that the light source 103 be turned ON to the light source unit 1102. Meanwhile, the timing controller 1108 sends a signal instructing that an exposure process be carried out by the image sensor 101 to the image capture device 1101. In this manner, an image is captured in the second frame with the light source 103 turned ON and sent to the semiconductor integrated circuit 1104.

Subsequently, the timing controller 1108 sends a signal instructing that the light source 105 be turned ON to the light source unit 1102. Meanwhile, the timing controller 1108 sends a signal instructing that an exposure process be carried out by the image sensor 101 to the image capture device 1101. In this manner, an image is captured in the third frame with the light source 105 turned ON and sent to the semiconductor integrated circuit 1104.

In the semiconductor integrated circuit 1104, the image frame output from the image capture device 1101 is processed by an image filter block 1106. Although the image filter block 1106 is not an indispensable element, preprocessing such as noise reduction filtering is performed according to this embodiment by the image filter block 1106 when image processing is carried out.

The image processed by the image filter block 1106 is sent to the distance calculating block 1105, in which the image is processed by the extreme value searching section 1107. An example of the data processed by the extreme value searching section 1107 is as shown in FIG. 5, in which shown is the luminance of the captured image on a predetermined line. Although luminance distributions on the same line are shown in FIG. 5 with respect to two image frames, luminance distributions on the same line are obtained according to this embodiment with respect to three image frames. In other words, if two image frames are chosen from three image frames, two graphs, each of which is as shown in FIG. 5, can be obtained. For example, a graph such as the one shown in FIG. 5 can be drawn up based on first and second image frames. In the same way, a graph such as the one shown in FIG. 5 can also be drawn up based on second and third image frames.

The extreme value searching section 1107 searches first the range where objects to detect are present. There are a lot of searching methods. For example, it is easy to search for luminance extreme values 303 and 304 based on the luminances 301 and 302 shown in FIG. 5. Alternatively, if an extreme value which is stabilized sufficiently with respect to motion needs to be obtained, it is possible to adopt a method in which a range where the luminance is equal to or greater than a certain value is detected and its center value is regarded as an extreme value.

Next, the extreme values 303 and 304 are regarded as having been obtained from the same object and paired with each other. In this case, two extreme values with close coordinates may be simply paired with each other. Or a range in which the luminance is equal to or higher than a certain value may be located in advance based on the sum of the luminances 301 and 302 and may be searched for extreme values.

Check the difference between the luminances 301 and 302 shown in FIG. 5, and it can be seen that there is a range with a luminance level even though there is no difference there. However, as such a range exists probably because an out-of-system light source is present outside of this device, that range could be regarded as disturbance factor and removed. If cost permits, an image may be captured with every light source of this system turned OFF and that range may be removed. Even so, the same effect can also be achieved.

The extreme value searching section 1107 outputs the coordinates and extreme values of the object detected. The coordinates may be those of the center or barycenter of the range 306 or those of the middle point between the extreme values 303 and 304. Meanwhile, the extreme values 303 and 304 may be used as they are as the luminances according to one method, or an integral value of the range may be obtained according to another method.

In this description, one-dimensional data on a particular line has been described for the sake of simplicity. However, the one-dimensional line may be an axis other than the horizontal line for capturing an image. Alternatively, the coordinates and luminances of a range with a high relative luminance level may also be searched for two-dimensionally.

The coordinates and extreme values of the object that have been output from the extreme value searching section 1107 are stored in the coordinate memory 1109 and then sent to the distance calculating section 1110.

The distance calculating section 1110 calculates the distance based on the ratio of the luminances that have been obtained from the first and second image frames. First of all, based on the coordinates of the object, the distance calculating section 1110 determines in what azimuth the object is located with respect to the image sensor 101. This azimuth can be determined uniquely with the property of an optical system such as a lens taken into account.

Next, when it is known at what distance the object is located in that azimuth, the three-dimensional position of the object can be estimated.

The radiation characteristic of an LED light source that changes with its position such as the one shown in FIG. 6 mentioned above has been obtained in each azimuth. The data shown in FIG. 6 is based on the fact that the intensity of light decreases inversely proportionally to the square of the distance between an LED light source and the object. Also, in order to increase the accuracy, the angle defined by the object at each distance with respect to the LED light source is corrected in accordance with the radiation characteristic shown in FIG. 2. If the data shown in FIG. 6 is available, the distance to the object can be calculated based on the luminance ratio.

The data shown in FIG. 6 may be calculated by the distance calculating section 1110 through trigonometric function calculation. Alternatively, the data shown in FIG. 6 may also be calculated by storing, as a table, a graph which has been obtained in advance by calculation or measurement and complementing the graph as needed.

The results obtained by the distance calculating block 1105 are supplied to the CPU 103 and used as 3D motion information there.

According to the configuration described above, processing can be advanced on the image data on a line-by-line basis. As a result, a motion sensor device which can detect the object in only one path with little latency is realizable.

The coordinates of the extreme values 303 and 304 do not always have to agree with each other. But as long as the material of the object is roughly uniform within the object area, these extreme values 303 and 304 can be used as the luminance ratio for calculating the distance. Optionally, the unit of measurement may be defined to be only the unit of an object with a certain width with attention paid to this property. According to this embodiment, the extreme values are searched for first, and then the distance is calculated based on the extreme values obtained. In this manner, the computations can get done more speedily with its complexity reduced significantly.

For example, in measuring the conditions of respective limbs of a human body, the extreme values of luminances of the respective regions that have been shot are obtained on an arm, leg or neck basis by reference to the data on a certain line. That is why compared to a method of calculating some distance at each pixel, the number of times of computations to get done can be reduced significantly.

Up to this point, the processing described above can get done with only the CPU and a software program. The processing flow of a software program to be executed in that case is shown in FIG. 13. This processing includes an extreme value searching step 1201, a threshold value determining step 1202, a luminance ratio calculating step 1203 and a distance converting step 1204.

In the extreme value searching step 1201, the image data is searched for a range with a relatively high luminance value (i.e., a range including an extreme value). Next, in the threshold value determining step 1202, the decision is made whether or not the given object is the object to be tracked in the extreme value searching step 1201. If the luminance or size of the range is equal to or smaller than a certain value, then the decision is made that "there is no object" and the data is regarded as noise and discarded. This threshold value determining step 1202 is not an indispensable step but is generally an important step to increase the robustness. On the other hand, if the decision made in the threshold value determining step 1202 is that "there is an object", then associated extreme values are paired with each other to calculate the luminance ratio. Subsequently, in the distance converting step 1204, the extreme values are converted into a distance based on the luminance ratio and the image capturing position.

Alternatively, this function can also be performed by storing a program defining the procedure described above on a magnetic recording medium or a semiconductor storage medium, for example, and getting the program done by the CPU.

According to this embodiment, by scanning the image only once in the extreme value searching step 1201, the luminance value and coordinates to be the object of calculation can be picked up. That is why by adopting this procedure, the computations can get done speedily.

The motion sensor device of this embodiment can be used in various applications. For example, by applying this motion sensor device to a camcorder, movie autofocusing can be controlled quickly. In addition, by recognizing respective fingers of a human being from a short distance or his or her body or limbs from a long distance, this device can also be used as a gesture recognizing motion sensor device.

In the embodiment described above, the light sources 102, 103 and 105 do not have to have the same height and same size but may have different heights or sizes. In addition, each of these light sources 102, 103 and 105 does not have to be a single LED chip, either. Alternatively, an LED array in which a number of LED chips are arranged may be used as each of those light sources. Furthermore, although not shown, optical members such as a lens and a filter may be arranged in each of those light sources 102, 103 and 105. The same can be said about the light sources of any of the other embodiments.

Figure 14A:
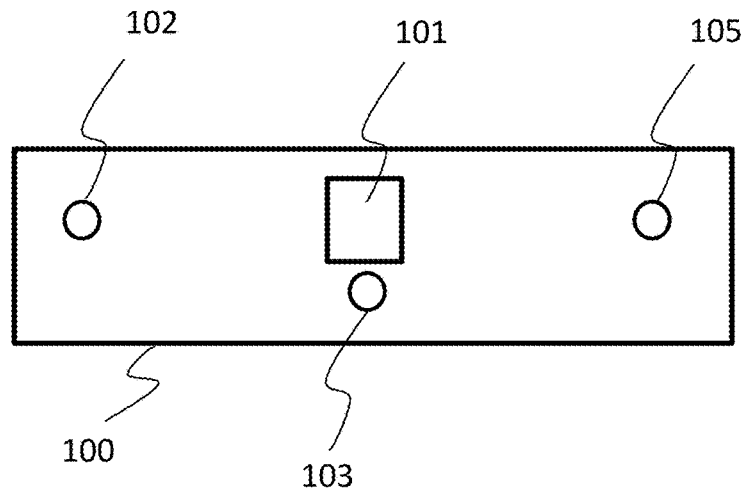
FIG. 14A A top view illustrating another exemplary arrangement according to the first embodiment of the present disclosure.
Figure 14B:
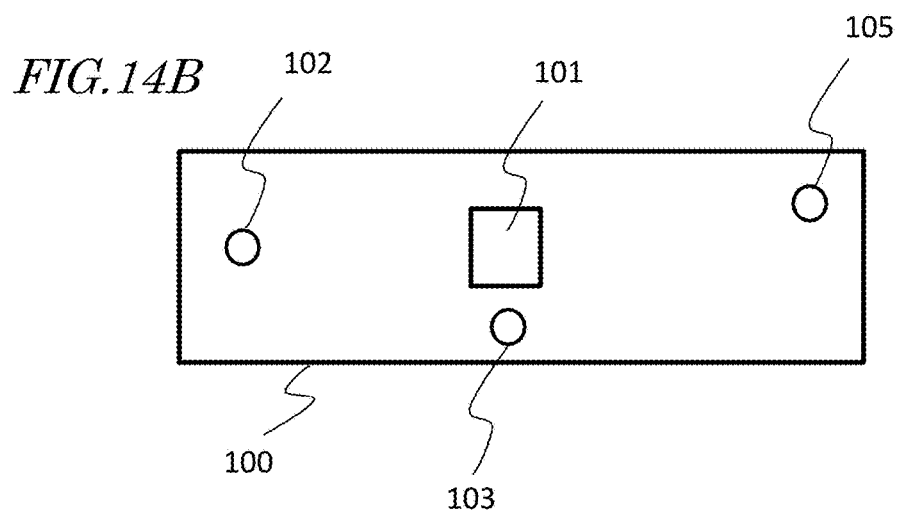
FIG. 14B A top view illustrating still another exemplary arrangement according to the first embodiment of the present disclosure.

The light sources 102, 103 and 105 and the image sensor 101 do not have to be arranged in line. FIGS. 14A and 14B are top views illustrating alternative arrangements for the light sources 102, 103 and 105 and the image sensor 101. Some of the light sources 102, 103 and 105 (e.g., the light source 103 in this example) may be arranged off the line as shown in FIG. 14A. Alternatively, one light source and the image sensor 101 may be arranged in line but the other light sources may be arranged off that line as shown in FIG. 14B.

In the example illustrated in FIG. 14A, two light sources 102 and 105 are arranged at the same distance but in mutually opposite directions with respect to the image sensor 101. However, those light sources 102 and 105 may also be arranged at different distances. On the other hand, in the example illustrated in FIG. 14B, the three light sources 102, 103 and 105 are arranged in mutually different directions with respect to the image sensor 101. When the light sources 102, 103 and 105 are arranged in different directions in this manner, the distances from the image sensor 101 to the respective light sources 102, 103 and 105 do not have to be different from, but may be equal to, each other.

As can be seen from the foregoing description, the controller 1000 of this embodiment gets a first piece of estimated distance information based on the ratio of an object's luminance obtained from a first image to the object's luminance obtained from a second image, and gets a second piece of estimated distance information based on the ratio of the object's luminance obtained from a second image to the object's luminance obtained from a third image. And the controller 1000 gets information about the distance to the object by either choosing one from, or synthesizing together, the first and second pieces of estimated distance information. However, the controller 1000 may get information about the distance to the object by performing a different operation from such an operation. For example, the controller 1000 can also obtain the distance to the object by either choosing one from, or synthesizing together, pieces of luminance information of multiple images yet to be converted into the distance.

Specifically, information about the distance to the object can be gotten based on the ratio of a fourth luminance which is obtained by mixing together the first and third luminances at a predetermined ratio to the second luminance. For example, suppose the first luminance is P1, the third luminance is P3, the mixing ratio is a (where 0<a<1) and the fourth luminance is P1×a+P3×(1−a). In that case, based on the ratio of the fourth luminance to the second luminance P2 (i.e., (P1×a+P3×(1−a))/P2), information about the distance to the object can be obtained by reference to the relation between the known luminance ratio and the distance. According to this method, the luminance mixing ratio a may be determined with respect to each pixel location in the image sensor 101.

Still alternatively, either the first luminance or the third luminance may be chosen and regarded as the fourth luminance, and the distance may be calculated in the same way as described above. This corresponds to a situation where the mixing ratio a described above is zero or one. Either the first luminance or the third luminance is chosen by determining whether or not the ratio or difference between the two luminances falls within a predetermined range.

Embodiment 2

A second embodiment of a motion sensor device according to the present disclosure will be described. The motion sensor device of this embodiment includes four light sources (which will be hereinafter referred to as first, second, third and fourth light sources 702, 703, 704 and 705, respectively). The device of this embodiment also includes the lens system 110 and controller 1000 with the same configurations as the ones already described with reference to FIG. 11. Thus, description thereof will be omitted herein to avoid redundancies.

Figure 15A:
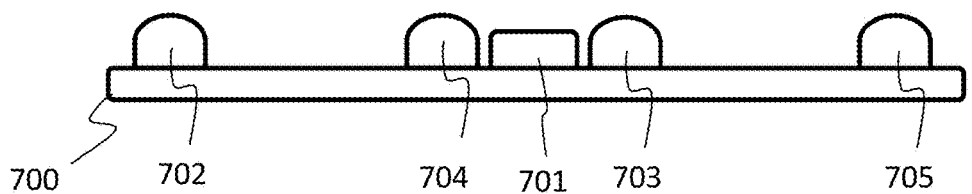
FIG. 15A Illustrates an arrangement of a light source unit and image sensor according to a second embodiment of the present disclosure.
Figure 15B:
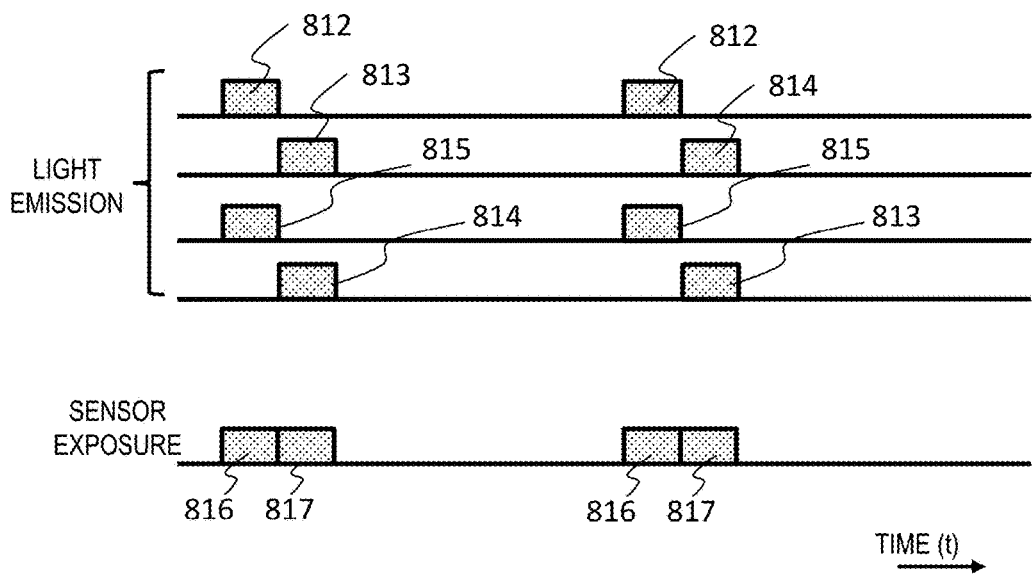
FIG. 15B A timing chart showing when the light sources and image sensor are activated in the second embodiment of the present disclosure.

FIG. 15A illustrates an arrangement of light sources in the motion sensor device of this embodiment. FIG. 15B is a timing chart showing the timings for this motion sensor device to control the light sources and the image sensor.

The motion sensor device of this embodiment includes an image sensor 701 and four LED light sources 702, 703, 704 and 705 which are mounted on a substrate 700. The LED light sources 702 and 703 are configured to emit light with a first wavelength. The LED light sources 704 and 705 are configured to emit light with a second wavelength. The image sensor 701 is configured to be able to detect at least the light with the first wavelength and the light with the second wavelength.

The first and second wavelengths may be arbitrary wavelengths but are supposed to be 780 nm and 850 nm, respectively, in the following description. Both of these are wavelengths falling within the near-infrared range. However, the first and second wavelengths do not have to be wavelengths falling within the near-infrared range but may also be visible light wavelengths, for example. From the standpoint of practical use, the first and second wavelengths are suitably set to be wavelengths falling within the near-infrared range. However, in applications in which there is no problem even if visible light is emitted (e.g., in industrial applications), the first and second wavelengths may be visible light wavelengths, too.

The directions in which the light sources 702 to 705 are located with respect to the image sensor 701 are supposed to be first through fourth directions, respectively, and the distances to the light sources 702 to 705 are supposed to be first through fourth directions, respectively. The second and fourth directions are opposite from the first direction. The third direction is the same as the first direction. Both of the second and third distances are shorter than the first and fourth distances. In this embodiment, the second and third distances are equal to each other, so are the first and fourth distances. However, such arrangements do not always have to be adopted.

The image sensor 701 is a special sensor which can capture two frames in a row by performing exposure processes twice continuously. The first embodiment described above needs a special sensor which can perform exposure processes three times in a row. Such a sensor should work fine in principle but it would take a lot of cost to make such a sensor actually. According to this embodiment, the distance can be measured with a configuration of a lower cost. In addition, according to this embodiment, not just can the distance be measured but also can the material of the object be determined as will be described later.

The periods 812, 813, 814 and 815 shown in FIG. 15B correspond to the periods in which the LED light sources 702, 703, 704 and 705 are respectively turned ON. The first and second exposure periods 816 and 817 correspond to the respective periods in which first and second frames are captured by the image sensor 101. According to the timing chart shown in FIG. 15B, the LED light sources 702 and 705 are turned ON simultaneously first, and then the LED light sources 703 and 704 are turned ON simultaneously. However, this is only an example. Instead, the emission may be controlled so that one of the LED light sources 702 and 703 that emit light with the first wavelength and one of the LED light sources 704 and 705 that emit light with the second wavelength are turned ON simultaneously.

If images are captured in accordance with the timing chart shown in FIG. 15B, the controller gets a first piece of estimated distance information based on the ratio of the luminance of an object's first wavelength component obtained from a first image produced by capturing the first frame to the luminance of the object's first wavelength component obtained from a second image produced by capturing the second frame. Also, the controller gets a second piece of estimated distance information based on the ratio of the luminance of the object's second wavelength component obtained from the first image to the luminance of the object's second wavelength component obtained from the second image. And the controller generates and outputs information about the distance to the object by either choosing one from, or synthesizing together, the first and second pieces of estimated distance information.

Figure 16:
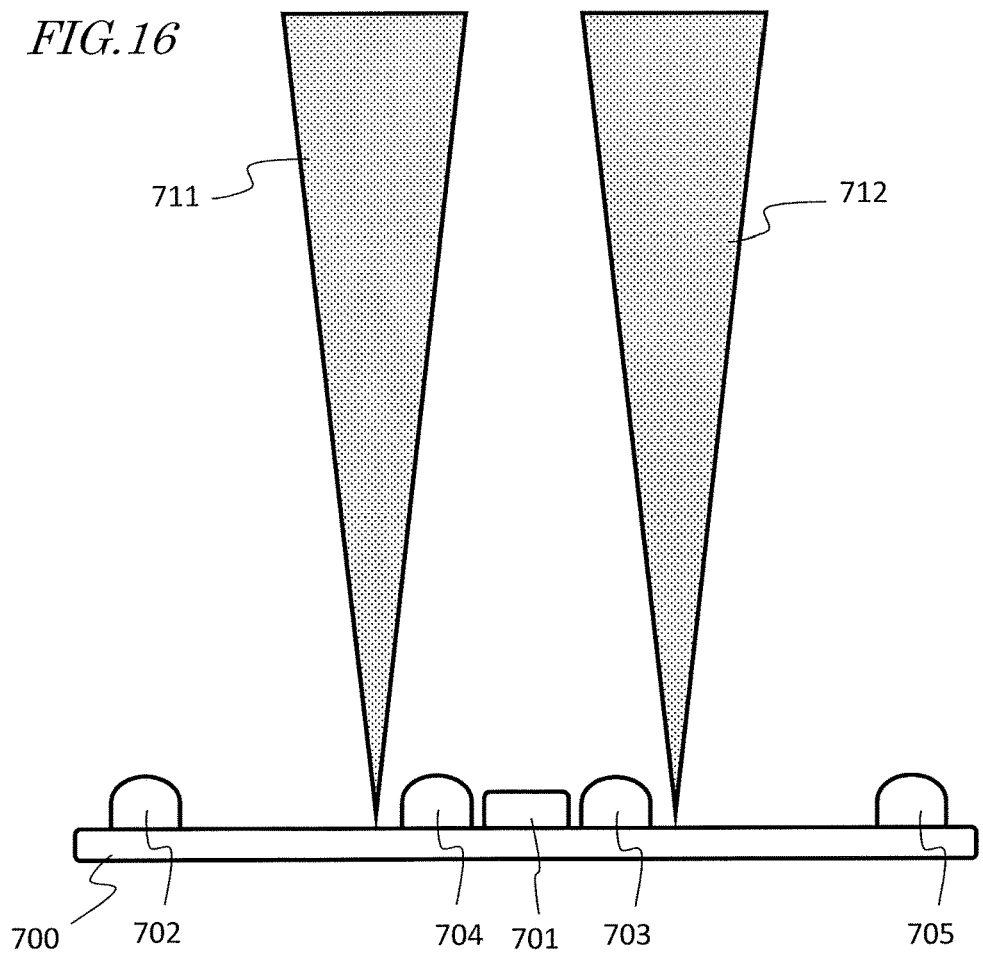
FIG. 16 Illustrates low-sensitivity ranges according to the second embodiment of the present disclosure.

FIG. 16 schematically illustrates low-sensitivity ranges associated with the first and second pieces of estimated distance information. If only the first piece of estimated distance information is used, a low-sensitivity range 711 is produced around a region which is located at an equal distance from the light sources 702 and 703. On the other hand, if only the second piece of estimated distance information is used, a low-sensitivity range 712 is produced around a region which is located at an equal distance from the light sources 704 and 705. Since the light sources 703 and 704 are arranged in this embodiment in the vicinity of the image sensor 101, the low-sensitivity range 504 at a close range shown in FIG. 8 is not produced.

The motion sensor device of this embodiment either chooses one from, or synthesizes together, the first and second pieces of estimated distance information, and therefore, can measure the distance to even an object located in the low-sensitivity range 711, 712. Specifically, if the ratio of the luminance of the object's first wavelength component obtained from the first image to the luminance of the object's first wavelength component obtained from the second image falls within a preset range (e.g., from 0.8 to 1.2), the controller gets information about the distance to the object based on only the second piece of estimated distance information. On the other hand, if the ratio of the luminance of the object's second wavelength component obtained from the first image to the luminance of the object's second wavelength component obtained from the second image falls within a preset range, the controller gets information about the distance to the object based on only the first piece of estimated distance information. Alternatively, the controller may use the first piece of estimated distance information only when the luminance of the object's first wavelength component obtained from the second image is greater than the luminance of the object's first wavelength component obtained from the first image. And the controller may use the second piece of estimated distance information only when the luminance of the object's second wavelength component obtained from the second image is greater than the luminance of the object's second wavelength component obtained from the first image. By performing such processing, the distance to the object can be measured accurately irrespective of that object's position.

The image sensor 701 may be a sensor which has multiple kinds of pixels with different spectral sensitivity characteristics just like a known color image sensor. There are various kinds of color image sensors, examples of which include a sensor with a Bayer arrangement in which R, G, G and B pixels are arranged as a unit consisting of four pixels, a sensor which can get signal electric charges of multiple color components in a single pixel by taking advantage of the fact that the transmission characteristic varies according to the wavelength, and a sensor in which incoming light is split through a prism on a color-by-color basis into multiple light beams to be received by a plurality of image capture devices on a color component basis. No matter which of these color image sensors is used, the light can be received to have its spectral sensitivity characteristic varied according to the color component, and therefore, the color image sensor may be used as the image sensor 701.

Figure 17:
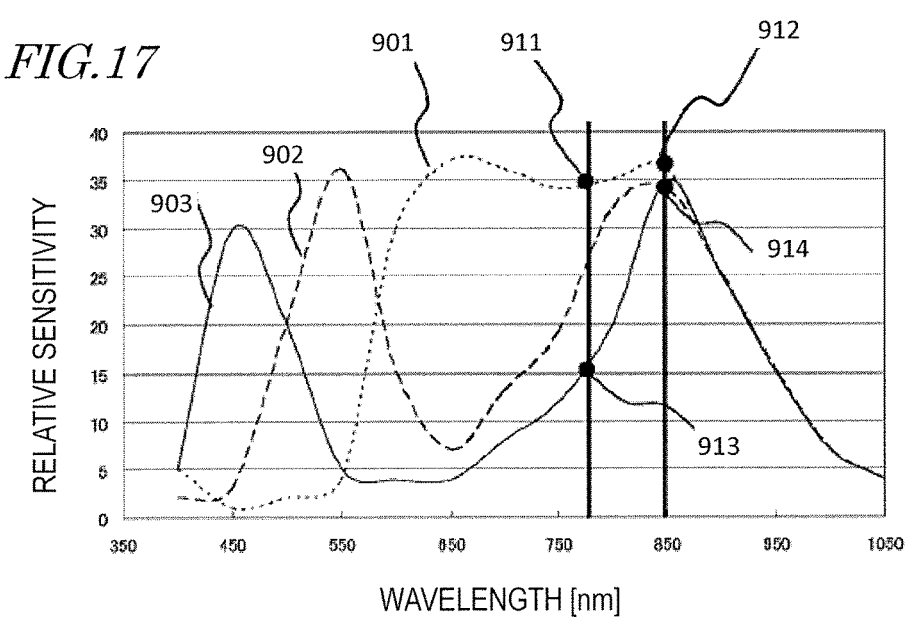
FIG. 17 Shows the sensitivity characteristics of an image sensor according to the second embodiment of the present disclosure.

FIG. 17 is a graph showing exemplary spectral sensitivity characteristics of the image sensor 701 according to this embodiment on a color component basis. In the graph shown in FIG. 17, the abscissa represents the wavelength and the ordinate represents the relative sensitivity value. This image sensor 701 is supposed to have an R pixel which detects mainly a color red component of the light, a G pixel which detects mainly a color green component, and a B pixel which detects mainly a color blue component. As shown in FIG. 17, each of the R, G and B pixels' spectral sensitivity characteristics 901, 902 and 903 is also sensitive to a wavelength falling within the near-infrared range. In the following example, it will be described how to obtain the respective luminance values of the first and second wavelength components by using the R and B pixels' sensitivities 911 and 913 to light with the first wavelength and the R and B pixels' sensitivities 912 and 914 to light with the second wavelength.

Suppose the R pixel's sensitivity 911 to the light with the first wavelength is "a", the R pixel's sensitivity 912 to the second wavelength is "b", the B pixel's sensitivity 913 to the first wavelength is "c", and the B pixel's sensitivity 914 to the second wavelength is "d". Also, suppose a luminance corresponding to the intensity of light with the first wavelength being incident on a certain pixel in one frame is "α" and a luminance corresponding to the intensity of light with the second wavelength is "β". In that case, the red and blue components r and b of the luminance of a certain pixel in one frame are represented by the following Equation (1):

$$\begin{pmatrix} r \\ b \end{pmatrix} = \begin{pmatrix} a & b \\ c & d \end{pmatrix} \begin{pmatrix} \alpha \\ \beta \end{pmatrix} \quad (1)$$

Thus, by obtaining the inverse matrix of the matrix of Equation (1), the luminances α and β of the first and second wavelength components of that pixel can be calculated by the following Equation (2):

$$\begin{pmatrix} \alpha \\ \beta \end{pmatrix} = \begin{pmatrix} a & b \\ c & d \end{pmatrix}^{-1} \begin{pmatrix} r \\ b \end{pmatrix} \quad (2)$$

By performing these computations on each of the first and second frames, the luminances of the first and second wavelength components in each frame can be obtained. Although the R and B pixels' spectral sensitivity characteristics are supposed to be used in this example, computations may be performed in the same way with one of these spectral sensitivity characteristics replaced with the G pixel's. Also, even when using an image sensor which can obtain signal electric charges of multiple color components in a single pixel or an image sensor which splits the incoming light through a prism on a color-by-color basis and which gets the resultant light beams received by multiple image capture devices on a color component basis by taking advantage of the fact that the transmission characteristic varies according to the wavelength, computations may be performed in the same way based on the color-by-color spectral sensitivity characteristics of the incident light.

As described above, the controller of this embodiment uses the respective luminances of the first wavelength components extracted from the first and second frames and calculates, based on the ratio of those luminances, the distance to the object as a first piece of estimated distance information. In this case, in the low-sensitivity range 711 in which the luminance ratio is close to one, the distance cannot be measured accurately. Meanwhile, the LED light source 703 is located so close to the image sensor 701 that there is almost no range where the relation between the light intensities inverts, and the distance can be measured accurately in a broad range, on the right-hand side of the low-sensitivity range 711.

The controller also uses the respective light intensity components with the second wavelength extracted from the first and second frames and calculates, based on the ratio of those light intensities, the distance to the object as a second piece of estimated distance information. In this case, in the low-sensitivity range 712 in which the luminance ratio is close to one, the distance cannot be measured accurately. Meanwhile, the LED light source 704 is located so close to the image sensor 701 that there is almost no range where the relation between the light intensities inverts, and the distance can be measured accurately in a broad range, on the left-hand side of the low-sensitivity range 712.

Thus, it can be seen that the first piece of estimated distance information obtained based on the luminance ratio of the first wavelength components and the second piece of estimated distance information obtained based on the luminance ratio of the second wavelength components complement the low-sensitivity range with each other. That is why the controller complements a range in which the sensitivity is low according to one of these two pieces of estimated distance information with the other piece of information, and synthesizes those pieces of information together (e.g., calculates their average with a weight added) as for a range where the sensitivity is high according to both of these pieces of information. By performing such processing, all of those ranges can be integrated together seamlessly, and the distance can be measured with high sensitivity.

According to this embodiment, the object is shot at two wavelengths (i.e., at the first and second wavelengths), and therefore, not only can the distance information be estimated but also can the object's material be determined as well. Next, it will be described how to determine the material in principle according to this embodiment.

Generally speaking, anything that exists in Nature has its absorptance varied with the wavelength, and the reflectance of the light that has not been absorbed also varies with the wavelength. That is why even if two light beams have been emitted at the same intensity but if their wavelengths are different, the reflected light beams may have different intensities. In the visible light range, their difference is recognized as a color difference. Even in the non-visible light range, the material of the object can be estimated by sensing a difference in intensity between reflected light beams.

As disclosed in Non-Patent Document No. 1, it is known that the human skin exhibits low reflectance to a near-infrared ray, of which the wavelength is in the vicinity of 970 nm. That is why just by comparing the levels of the reflected light intensity of that near-infrared ray in the vicinity of 970 nm and the reflected light intensity of a near-infrared ray in the vicinity of 870 nm, at which the reflectance is relatively high, the estimation can be made whether the object would be a human skin or not. This estimation can be made not just at those wavelengths of around 970 nm and around 870 nm but also at any other wavelength as well.

Thus, the controller of this embodiment determines the material of the object based on either the difference or ratio between the respective luminances of the object's first and second wavelength components in at least one of the first and second images. For example, the controller may determine whether or not the difference between the respective luminances of the object's first and second wavelength components agrees with the difference in human skin reflectance to light beams with the first and second wavelengths. By performing such processing, the decision can be made whether or not the object is a human hand. Although a human hand is supposed to be detected as target in this example, decision can be made in the same way with respect to a pointer or any other target as well.

According to a more sophisticated method, an additional light source for use to estimate the material (which will be hereinafter referred to as a "fifth light source") may be further provided besides the ones for use to measure the distance. The material-estimating light source may be configured to emit light with a third wavelength (of 970 nm, for example) which is different from the two wavelengths (i.e., the first and second wavelengths) for measuring the distance. Optionally, the material-estimating light source may be a combination of multiple light sources which emit light beams with mutually different wavelengths. The object's material can be determined based on the difference in reflected light intensity between at least two light beams with different wavelengths. For example, supposing the two distance-measuring wavelengths are $\lambda 1$ and $\lambda 2$ and the material-estimating wavelength is $\lambda 3$, the object's material can be estimated based on the ratio of the respective luminances at these three wavelengths. Alternatively, by using three light sources which emit light beams at the wavelengths $\lambda 1$, $\lambda 2$ and $\lambda 3$, the object's material can also be determined based on the ratio of the luminances at these three wavelengths. More specifically, using a color image sensor which detects light beams falling within the RGB wavelength ranges and three light sources which emit light beams falling within the RGB wavelength ranges, the material can be determined based on the ratio of the respective luminances of these three components. If multiple conditions have been set in advance in association with a plurality of materials with respect to the ratio of the luminances of these three components, the decision can be made selectively with respect to those materials.

Although the material-estimating light source is supposed to be provided separately from the distance-measuring light sources in the example described above, these two types of light sources may be integrated together. That is to say, a light source which emits light falling within a broad wavelength range covering not only the first and second wavelengths but also the third wavelength as well may be used to measure the distance and to estimate the material. If at least one of the first through fourth light sources 702 to 705 is such a light source, the material can be determined in the same way as in a situation where the fifth light source is added.

In one application, a 3D motion sensor may be used as a user interface to detect only a human finger or pointer, for example. When a pointer is being tracked, for example, information about a human finger may need to be eliminated as wrong information. In that case, the motion sensor of this embodiment can determine, based on the difference in luminance between at least two wavelength components, whether the object is a pointer or a finger. Also, if a pointer is made of a dedicated material with a characteristic spectral reflection property, such a pointer will cause much less erroneous detection.

As can be seen, according to this embodiment, based on the difference between the light intensities (or luminances) of at least two wavelength components obtained in the same frame, not just can the distance be measured but also can the object's material be estimated as well without newly adding another resource. By using light with a different wavelength as needed, multiple different kinds of materials can be determined as well.

Although the first and second wavelengths are both supposed to fall within the near-infrared range in the embodiment described above, this is only an example. The wavelength settings described above are adopted because it is often convenient to use non-visible light which is invisible to human beings, considering the property of a motion sensor. However, the measurement itself may be made with visible light as well. For example, in an application in which a non-human object is the object of measurement, the visible light wavelength range with high sensitivity may also be used.

Also, a camera which uses a color image sensor ordinarily cuts light falling within the infrared range by adding an infrared cut filter to its optical system. According to this embodiment, on the other hand, the infrared cut filter can be omitted, and therefore, a motion sensor device is realized at a lower cost. In addition, according to this embodiment, an ordinary color image sensor for shooting under visible light can also be used. Naturally, an image sensor including a color filter with a good performance which is specially designed for this embodiment may be used, but the cost usually increases in that case.

Although LED light sources are used in the embodiment described above, the light sources do not have to be LED light sources but may also be point light sources or any other kind of light sources with a three-dimensionally varying intensity distribution. Since the wavelengths need to be defined, it is also effective to use laser light sources. A laser light source emits parallel light, and therefore, its light intensity does not vary three-dimensionally. However, a laser light source may also be used if the parallel light is turned into scattering light by combining the laser light source with a diffuser, for example.

Furthermore, although the second and third LED light sources 703 and 704 are handled separately in the embodiment described above, these two light sources may be integrated together. Since these light sources are arranged close to each other and may be made to emit light at the same timing in one embodiment, a single light source unit which emits light falling within a broad wavelength range covering the first and second wavelengths may be used as the second and third light sources.

As described above, the controller 1000 of this embodiment is configured to generate a first piece of estimated distance information based on the ratio of the luminance of an object's first wavelength component obtained from a first image to the luminance of the object's first wavelength component obtained from a second image, generate a second piece of estimated distance information based on the ratio of the luminance of the object's second wavelength component obtained from the first image to the luminance of the object's second wavelength component obtained from the second image, and get information about the distance to the object by either choosing one from, or synthesizing together, the first and second pieces of estimated distance information. However, the controller 1000 does not always have to operate in this manner but may get information about the distance to the object by operating in any other manner as well. For example, if the object's first wavelength components obtained from the first image and the second image produced by capturing a second frame are called first and second luminances, respectively, and if the object's second wavelength components obtained from the first and second images are called third and fourth luminances, respectively, the controller 1000 may be configured to get information about the distance to the object based on the ratio of a fifth luminance which is obtained by either choosing one from, or synthesizing together, the first and second luminances to a sixth luminance which is obtained by either choosing one from, or synthesizing together, the third and fourth luminances.

Specifically, the fifth luminance may be defined by mixing the first and second luminances at a predetermined mixing ratio, the sixth luminance may be defined by mixing the third and fourth luminances at a predetermined mixing ratio, and information about the distance to the object can be gotten based on the ratio of the fifth and sixth luminances. According to this method, the luminance mixing ratio may be adjusted on a pixel location basis in the image sensor 101.

Alternatively, one chosen from the first and second luminances may be defined to be the fifth luminance, one chosen from the third and fourth luminances may be defined to be the sixth luminance, and the distance may be calculated in the same way as described above. The choice of one of the two luminances is made by determining whether or not the ratio or difference between those two luminances falls within a predetermined range.

OTHER EMBODIMENTS

Although Embodiments 1 and 2 have been described, these are just examples of the technique of the present disclosure. Thus, some other exemplary embodiments will be described.

Figure 18:
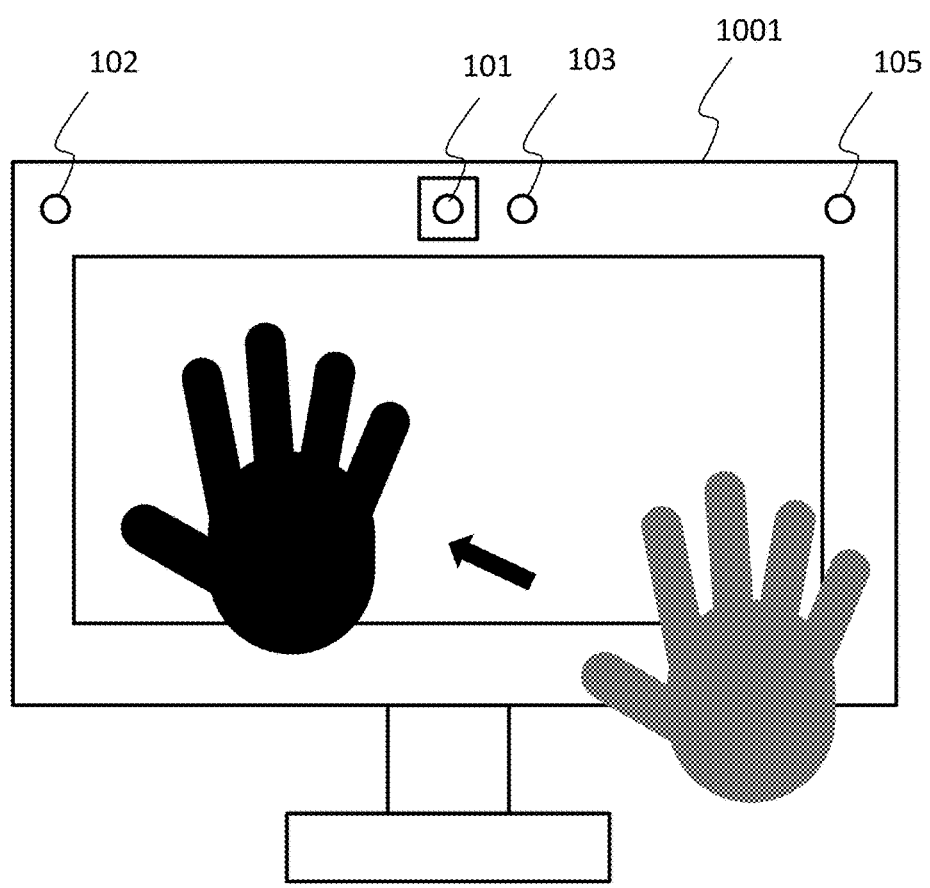
FIG. 18 Illustrates an exemplary product in which a motion sensor device according to the first embodiment of the present disclosure is built.

FIG. 18 illustrates a display 1001 with a motion sensor device according to the first embodiment. This display 1001 includes three LED light sources 102, 103 and 105, and therefore, can sense motion with the low-sensitivity range cut down. That is why a gesture input can be made toward the center of the display 1001. In FIG. 18, illustrated schematically is a hand making the gesture input for your reference. The hand illustrated in FIG. 18 is moving in the direction indicated by the arrow. The display shown in FIG. 18 can sense such a motion of the hand (i.e., a gesture input) with high sensitivity.

If the motion sensor device of this embodiment is applied to a display, for example, the device can be used as a user interface which allows the user to change channels with a gesture input. This motion sensor device is also applicable to a dance game to recognize the motion of respective limbs of a human being.

Alternatively, a motion sensor device according to the second embodiment or any other embodiment may be built in the display shown in FIG. 18. As can be seen, the present disclosure may be implemented as an electronic device including a motion sensor device according to any of the embodiments described above and a display which changes the content to be presented thereon in response to the object's motion that has been detected by the motion sensor device.

A motion sensor device according to various embodiments of the present disclosure can reduce errors in measuring the distance and can operate much more quickly. A 3D motion sensor device according to the present disclosure can be used in applications in which detection needs to be done in real time. In addition, according to one aspect, not only can the distance be measured but also can the material of the object be determined as well. As a result, the present disclosure realizes a motion sensor device which can detect a human hand or a pointer with erroneous detection reduced significantly.

Optionally, some of the functions of a motion sensor device according to the present disclosure may be performed by another device which is connected to the former device through a wired or wireless network.

INDUSTRIAL APPLICABILITY

An embodiment of a motion sensor device according to the present disclosure has the ability to measure the three-dimensional position of an object in real time, and therefore, can be used effectively as a non-contact gesture user interface for a display device and various other kinds of electronic devices. In addition, this motion sensor device may also be used as a car device to monitor the state of person(s) inside the car and persons outside of the car and to detect any obstacles. Furthermore, the motion sensor device can also be used in autofocusing for a camcorder.

REFERENCE SIGNS LIST 101, 701 image sensor
102, 103, 105, 702, 703, 704, 705 LED light source
301, 302 luminance
303, 304 extreme value
305 difference in coordinate between extreme values of luminances
504, 505, 605, 606, 711, 712 low-sensitivity range
802, 803, 804, 812, 813, 814, 815 light-emitting period
805, 806, 807, 816, 817 exposure period
901, 902, 903 pixel's spectral sensitivity characteristic
1001 display device
1101 image capture device
1102 light source unit
1103 CPU
1104 semiconductor integrated circuit
1105 distance calculating block
1106 image filter block
1107 extreme value searching section
1109 coordinate memory
1110 distance calculating section

The invention claimed is:

1. A motion sensor device comprising:
an image sensor;
first, second and third light sources; and
a processor configured to control the image sensor and the first to third light sources,
wherein the processor is configured to:
make the image sensor capture a first frame with light emitted from the first light source at a first time;
make the image sensor capture a second frame with light emitted from the second light source at a second time;
make the image sensor capture a third frame with light emitted from the third light source at a third time;
generate a first piece of estimated distance information based on a ratio of a luminance of an object obtained from a first image produced by capturing the first frame to a luminance of the object obtained from a second image produced by capturing the second frame;
generate a second piece of estimated distance information based on a ratio of the luminance of the object obtained from the first image to a luminance of the object obtained from a third image produced by capturing the third frame; and
obtain information about a distance to the object by either choosing one from, or synthesizing together, the first and second pieces of estimated distance information, wherein the information about the distance to the object is obtained:
based on only the second piece of estimated distance information when the ratio of the luminance of the object obtained from the first image to the luminance of the object obtained from the second image falls within a preset range, and
based on only the first piece of estimated distance information when the ratio of the luminance of the object obtained from the second image to the luminance of the object obtained from the third image falls within a preset range.

2. The motion sensor device of claim 1, wherein the first light source is arranged at a first distance from the image sensor in a first direction,
the second light source is arranged at a second distance from the image sensor in a second direction,
the third light source is arranged at a third distance from the image sensor in a third direction,
the second and third directions are opposite from the first direction, and
the second distance is shorter than any of the first and third distances.

3. The motion sensor device of claim 1, wherein the processor is configured to obtain information about the distance to the object based on the first piece of estimated distance information only when the luminance of the object obtained from the second image is greater than the luminance of the object obtained from the first image, and
obtain information about the distance to the object based on the second piece of estimated distance information only when the luminance of the object obtained from the second image is greater than the luminance of the object obtained from the third image.

4. The motion sensor device of claim 1, wherein the image sensor is configured to be able to detect light with a first wavelength which is a near-infrared ray, and
the first to third light sources are configured to emit light with the first wavelength.

5. An electronic device comprising:
the motion sensor device of claim 1; and
a display which changes what to present thereon in response to an object's motion detected by the motion sensor device.

6. The motion sensor device of claim 1 further comprising an integrated circuit comprising:
a timing controller which is connected to the image sensor and the light sources to control timings of exposure and light emission;
an extreme value searching section which processes image capturing data to search an area with a relatively high luminance;
a coordinate memory which stores coordinates and luminance of the area that has been searched by the extreme value searching section; and
a distance calculating section which calculates estimated distance information based on a luminance ratio by choosing frames that have been shot in the same area under different conditions from data in the coordinate memory.

7. The motion sensor device of claim 1, wherein the processor is further configured to:
search for an extreme value by extracting selectively a range with a relatively high light intensity from data of captured frames and by calculating its coordinates and light intensity;
calculate a ratio of luminances that have been extracted in the extreme value searching step and that have been selected from among luminances of frames shot under different conditions; and
convert the luminance ratio calculated in the luminance ratio calculating step and the coordinates searched for in the extreme value searching step into a distance.

8. The motion sensor device of claim 1 comprising:
a non-transitory computer readable medium having encoded thereon a computer program configured to:
cause the motion sensor device of claim 1 to perform the steps of:

searching for an extreme value by extracting selectively a range with a relatively high light intensity from data of captured frames and by calculating its coordinates and light intensity;

calculating a ratio of luminances that have been extracted in the extreme value searching step and that have been selected from among luminances of frames shot under different conditions; and converting the luminance ratio calculated in the luminance ratio calculating step and the coordinates searched for in the extreme value searching step into a distance.

\* \* \* \* \*